United States Patent
Bhattacharyya et al.

(10) Patent No.: US 10,230,528 B2
(45) Date of Patent: Mar. 12, 2019

(54) TREE-LESS INTEGRITY AND REPLAY MEMORY PROTECTION FOR TRUSTED EXECUTION ENVIRONMENT

(71) Applicant: Intel Corporation, Santa Clara, CA (US)

(72) Inventors: Binata Bhattacharyya, Portland, OR (US); Amy L. Santoni, Scottsdale, AZ (US); Raghunandan Makaram, Northborough, MA (US); Francis X. McKeen, Portland, OR (US); Simon P. Johnson, Beaverton, OR (US); George Z. Chrysos, Portland, OR (US); Siddhartha Chhabra, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/703,420

(22) Filed: May 4, 2015

(65) Prior Publication Data

US 2016/0328335 A1 Nov. 10, 2016

(51) Int. Cl.
*G06F 11/30* (2006.01)
*G06F 12/14* (2006.01)
*H04L 9/32* (2006.01)
*H04L 9/06* (2006.01)

(52) U.S. Cl.
CPC .......... *H04L 9/3242* (2013.01); *H04L 9/0637* (2013.01); *H04L 2209/12* (2013.01)

(58) Field of Classification Search
CPC ......... G06F 12/1408; G06F 2212/1052; H04L 9/0819; H04L 2209/24
USPC ......................................................... 713/193
See application file for complete search history.

(56) References Cited

U.S. PATENT DOCUMENTS

| | | | |
|---|---|---|---|
| 8,819,455 B2 | 8/2014 | Chhabra et al. | |
| 8,832,466 B1 * | 9/2014 | McGregor, Jr. | H04L 9/0836 380/37 |
| 9,323,876 B1 * | 4/2016 | Lysaght | G06F 8/65 |
| 2006/0015753 A1 * | 1/2006 | Drehmel | G06F 21/72 713/193 |
| 2006/0080553 A1 * | 4/2006 | Hall | G06F 12/0875 713/189 |
| 2006/0095793 A1 * | 5/2006 | Hall | G06F 12/145 713/190 |

(Continued)

OTHER PUBLICATIONS

Blaise Gassend, Caches and Hash Trees for Efficient Memory Integrity Verification, Nokia Research Center; year: 2014; p. 1-12.*

(Continued)

*Primary Examiner* — Monjur Rahim
(74) *Attorney, Agent, or Firm* — Lowenstein Sandler LLP

(57) ABSTRACT

Systems and methods for memory protection for implementing trusted execution environment. An example processing system comprises: an on-package memory; a memory encryption engine (MEE) comprising a MEE cache, the MEE to: responsive to failing to locate, within the MEE cache, an encryption metadata associated with a data item loaded from an external memory, retrieve at least part of the encryption metadata from the OPM, and validate the data item using the encryption metadata.

20 Claims, 14 Drawing Sheets

(56) References Cited

U.S. PATENT DOCUMENTS

| | | | |
|---|---|---|---|
| 2010/0169968 A1* | 7/2010 | Shanbhogue | G06F 9/4812 726/22 |
| 2012/0278635 A1* | 11/2012 | Hars | G06F 12/14 713/193 |
| 2014/0153575 A1* | 6/2014 | Munoz | H04L 45/742 370/392 |
| 2014/0223197 A1* | 8/2014 | Gueron | G06F 21/72 713/193 |
| 2015/0046702 A1* | 2/2015 | Paaske | G09C 1/00 713/160 |
| 2015/0135283 A1* | 5/2015 | Tofighbakhsh | H04L 63/08 726/5 |
| 2015/0186295 A1* | 7/2015 | Savagaonkar | G06F 12/1408 713/193 |
| 2015/0370728 A1* | 12/2015 | Yamada | G06F 12/1416 711/163 |
| 2016/0378687 A1* | 12/2016 | Durham | G06F 12/1408 713/193 |

OTHER PUBLICATIONS

U.S. Appl. No. 14/661,044 "Cache and Data Organization for Memory Protection" filed Mar. 18, 2015.

* cited by examiner

TREE-LESS INTEGRITY AND REPLAY MEMORY PROTECTION FOR TRUSTED EXECUTION ENVIRONMENT

TECHNICAL FIELD

The present disclosure is generally related to computer systems, and is specifically related to memory protection for implementing trusted execution environment.

BACKGROUND

Securing execution and integrity of applications and data within a computer system is of growing importance. Various known security techniques fail to adequately secure applications and data in a flexible but reliable manner.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
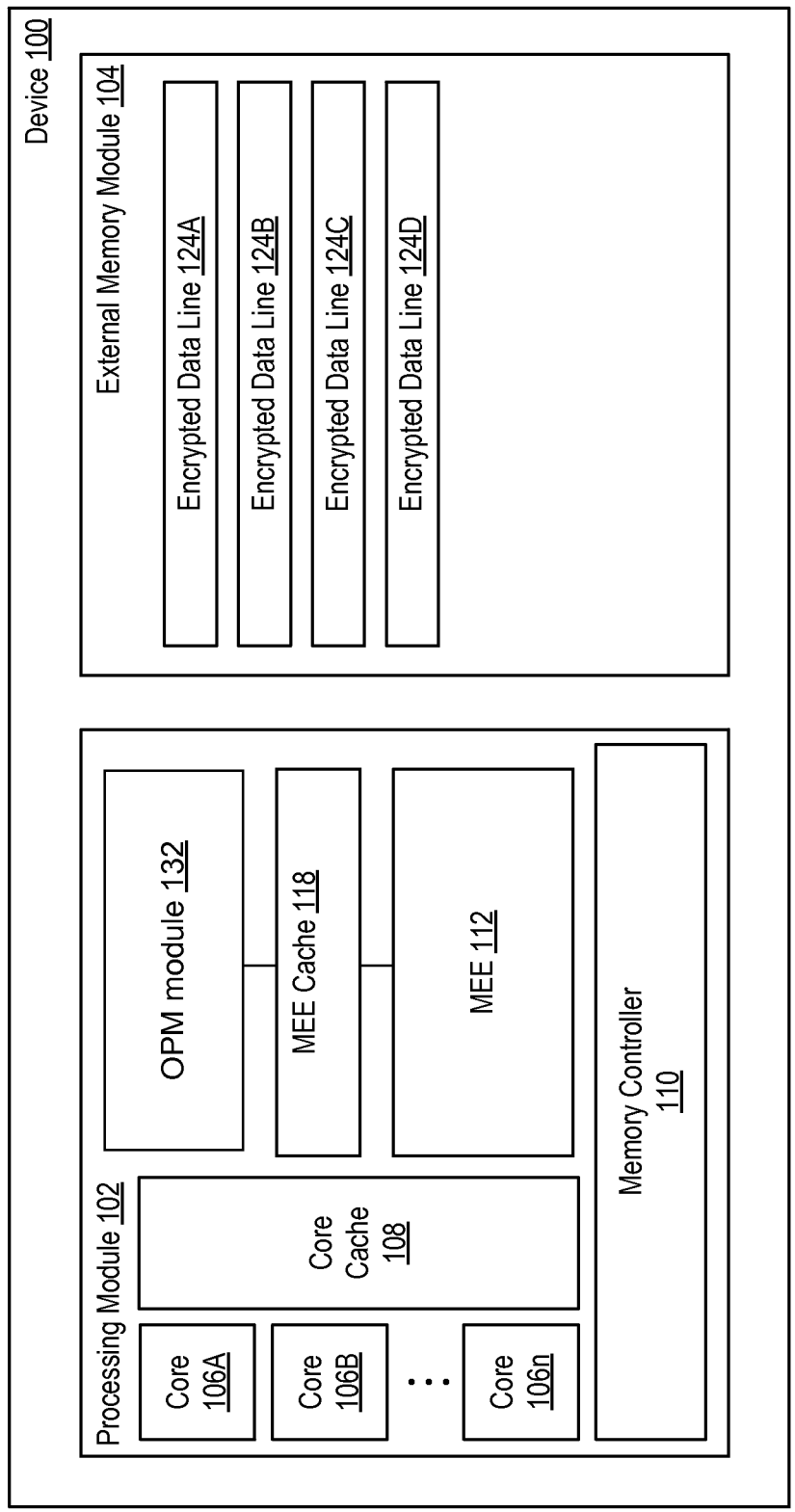
FIG. 1 depicts a high-level component diagram of an example processing system, in accordance with one or more aspects of the present disclosure.

Described herein are processing systems and related methods for memory protection for implementing trusted execution environment.

"Memory protection" may generally comprise protecting the confidentiality of data via encryption, integrity and/or replay protection. Integrity protection may defend against attacks wherein, for example, an attacker may modify encrypted data in memory prior to decryption. Replay protection may prevent attacks wherein, for example, an attacker causes a decryption operation to be repeated to gain unauthorized access to protected data.

An example processing system may implement a trusted execution environment for protecting, at the micro-architectural level, the applications being executed by the processing system and the data being accessed by the applications. Such a processing system may comprise memory encryption engine (MEE) hardware module for encrypting the data lines which are moved from an on-package memory to a memory which is external with respect to the processor chip (such as the main system memory).

In certain implementations, for each data line moved to the external memory, the MEE may store a message authentication code (MAC) value associated with it. When the data line is read from the external memory, its integrity may be verified by calculating the MAC value of the data line and comparing the calculated MAC value with the stored MAC value. Replay protection may be further provided by storing the version (VER) of the data line which is incremented each time when the data line is written back to the external memory.

In certain implementations, the data lines may be encrypted using the Advanced Encryption Standard (AES) counter-encryption method, according to which an exclusive OR (XOR) operation may be performed between the data to be encrypted or decrypted and a cryptopad generated based on a seed. Spatial uniqueness of the seed may be derived from the address of the data line, while the temporal uniqueness of the seed may be achieved by using the VER data associated with the data line.

In certain implementations, the MAC and VER values are stored in the external memory, and thus also need to be protected from being accessed or tampered with. To protect the MAC and VER values themselves, a replay tree may be employed, in which each node is verified by an embedded MAC (eMAC) calculated based on the node contents and a value of a counter that is stored on the next level of the tree. Values of MAC, VER and counters may be collectively referred to as "encryption metadata" herein.

The replay protection tree may have a variable number of levels, such that the size of the top level counter is small enough to be stored in static random access memory (SRAM) within the processor chip. To ensure the replay protection, each data line read from the external memory is verified by walking the tree to the top-level counter starting from a terminal node that stores the VER value for the data line.

In order to keep the size of the top-level counter small enough to be stored on the processor chip, the number of levels in the replay protection tree grows linearly with the size of the protected memory region. In an illustrative example, for protecting a 64 GB memory region, seven-level tree may be utilized, thus requiring the top-level counter of 8 KB. Hence, for reading each data line, seven additional memory lines would need to be loaded from the external memory, thus creating an overhead of seven times system bus bandwidth as compared to what would be needed for an unprotected memory read.

In accordance with one or more aspects of the present disclosure, the bandwidth overhead may be dramatically reduced or completely eliminated by placing at least part of the encryption metadata into an on-package memory (OPM) module.

In certain implementations, the OPM module may be employed as the storage for both MAC and VER lines, thus eliminating the need for maintaining the replay tree, as described in more details herein below. In an illustrative example, for protecting a 64 GB memory region, the OPM storage having the size of 16 GB size is needed for storing MAC and VER values.

Alternatively, the OPM module may be employed as the storage for MAC lines, while VER lines may be stored in the external memory, thus reducing the size of the replay tree to a single counter level, as described in more details herein below. In an illustrative example, for protecting a 64 GB memory region, the OPM storage having the size of 9 GB is needed for storing MAC and VER values.

Alternatively, the OPM module may be employed as the storage for MAC lines, and the need for VER lines may be eliminated by utilizing an alternative encryption/hash scheme (such as XTS-AES and HMAC), as described in more details herein below.

Various aspects of the above referenced methods and systems are described in more details herein below by way of examples, rather than by way of limitation.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation in order to provide a thorough understanding of the present disclosure. It will be apparent, however, to one skilled in the art that these specific details need not be employed to practice the methods disclosed herein. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following examples are described with reference to a processor, other implementations are applicable to other types of integrated circuits and logic devices. Similar techniques and teachings of examples described herein can be applied to other types of circuits or semiconductor devices that can benefit from higher pipeline throughput and improved performance. The teachings of examples described herein are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed.

The examples illustrating the present disclosure and accompanied drawings should not be construed in a limiting sense as they are merely intended to provide examples of embodiments described herein rather than to provide an exhaustive list of all possible implementations of embodiments described herein. Although the below examples describe instruction handling and distribution in the context of execution units and logic circuits, other implementations of the systems and methods described herein can be accomplished by way of a data or instructions stored on a machine-readable, tangible medium, which when performed by a machine cause the machine to perform functions consistent with at least one embodiment described herein. In certain implementations, functions associated with embodiments described herein are embodied in machine-executable instructions. The instructions can be used to cause a general-purpose or special-purpose processor that is programmed with the instructions to perform the methods described herein. Implementations described herein may be provided as a computer program product or software which may include a machine or computer-readable medium having stored thereon instructions which may be used to program a computer (or other electronic devices) to perform one or more operations according to embodiments described herein. Alternatively, operations of systems and methods described herein may be performed by specific hardware components that contain fixed-function logic for performing the operations, or by any combination of programmed computer components and fixed-function hardware components.

Instructions used to program logic to perform the methods described herein can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

"Processor" herein shall refer to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may include one or more processing cores, and hence may be a single core processor which is typically capable of processing a single instruction pipeline, or a multi-core processor which may simultaneously process multiple instruction pipelines. In another aspect, a processor may be implemented as a single integrated circuit, two or more integrated circuits, or may be a component of a multi-chip module (e.g., in which individual microprocessor dies are included in a single integrated circuit package and hence share a single socket).

Referring now to FIG. 1, shown is a block diagram of an example system 100 in accordance with one or more aspects of the present disclosure. As shown in FIG. 1, example system 100 may include a processing module 102 operatively coupled to a memory module 104. In certain implementations, system 100 may utilize Software Guard Extension (SGX) technology to protect at least a portion of memory module 104. SGX may provide a secure, hardware-encrypted computation and storage area within system memory, the contents of which cannot be deciphered by privileged code or even through applying hardware probes to memory bus. In certain implementations, system 100 may utilize other security technologies.

Figure 5:
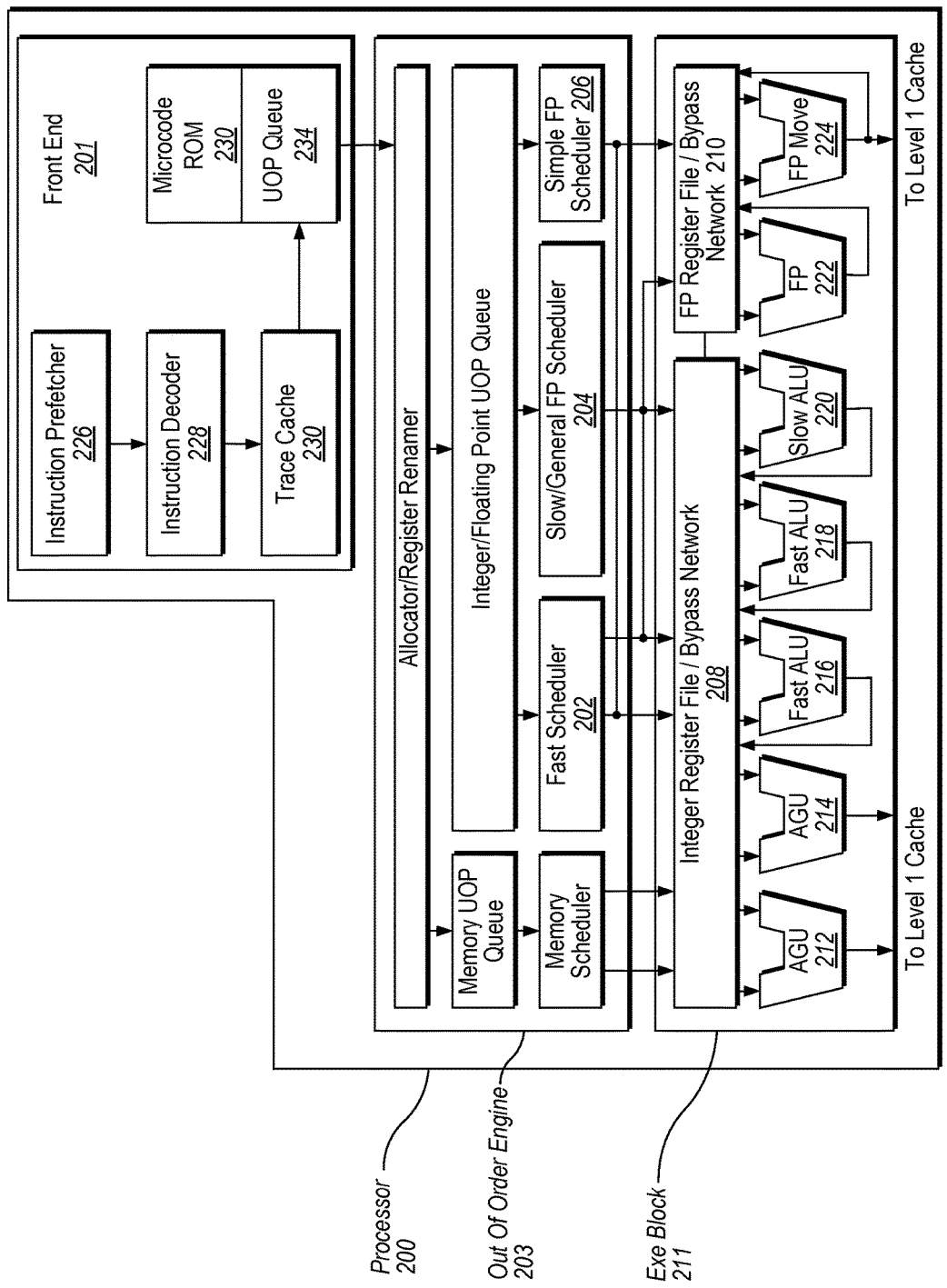
FIG. 5 depicts a block diagram of a processor, in accordance with one or more aspects of the present disclosure.
Figure 6:
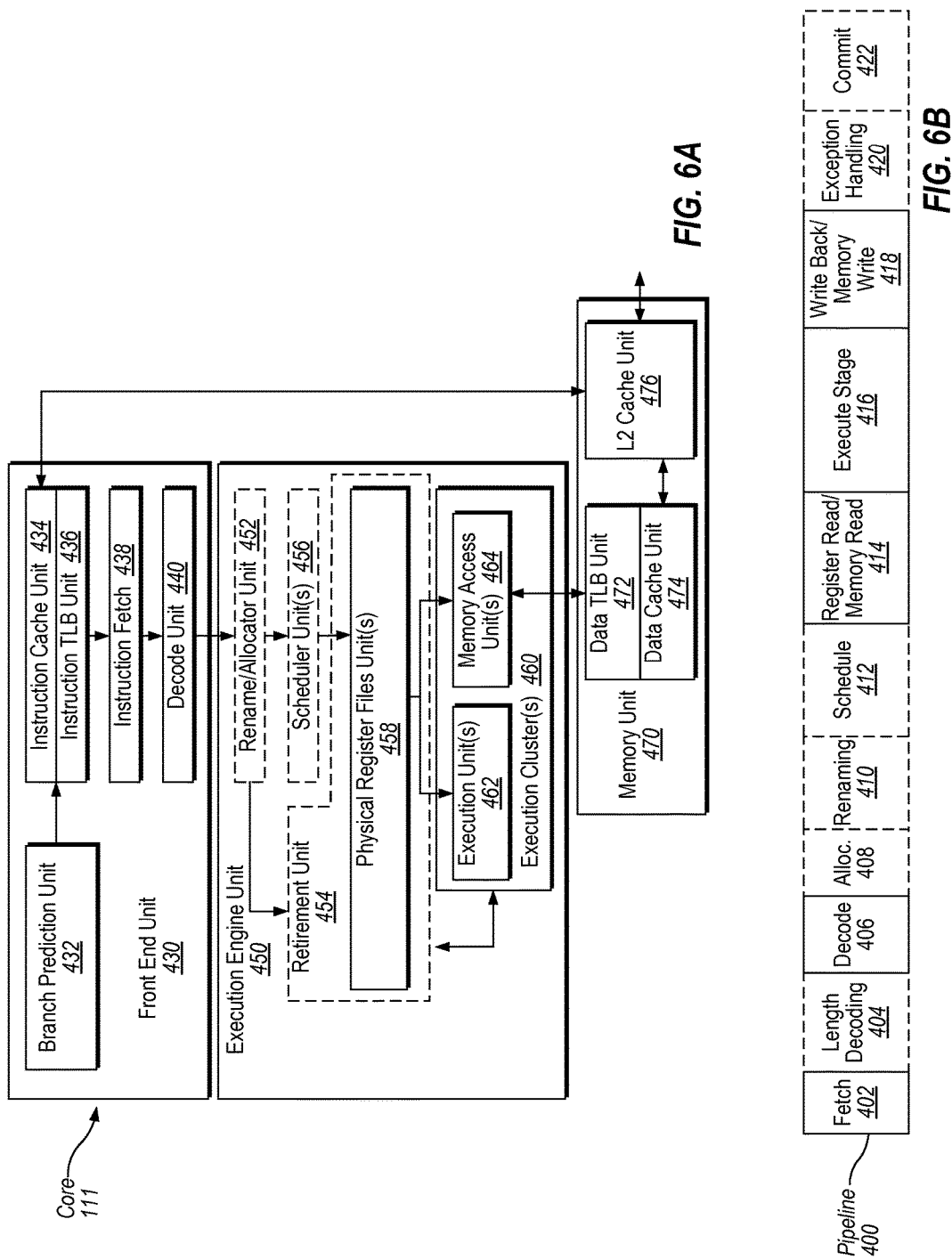
FIGS. 6A-6B schematically illustrates elements of a processor micro-architecture, in accordance with one or more aspects of the present disclosure.
Figure 7:
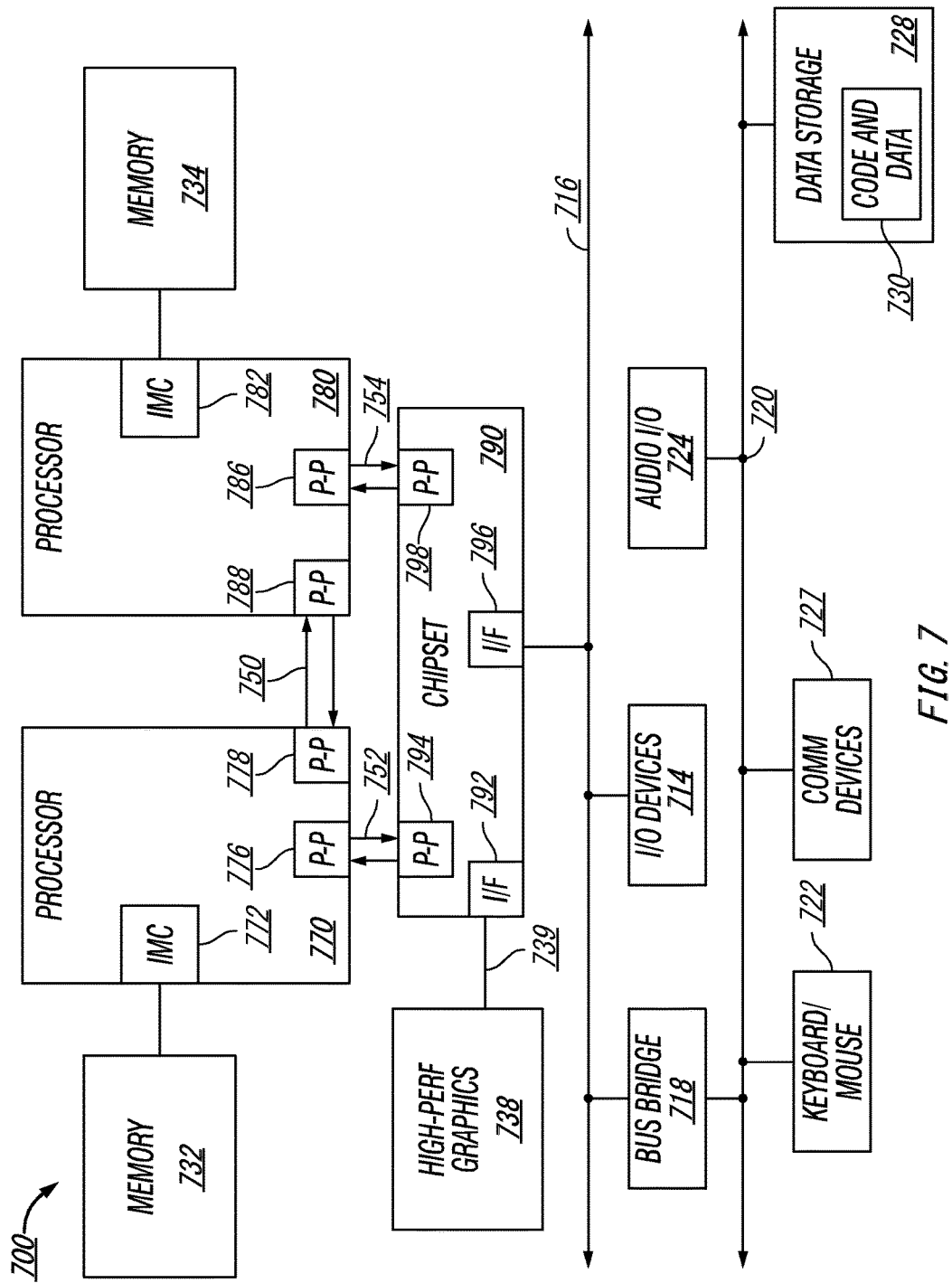
FIG. 7 depicts a block diagram of an example computer system, in accordance with one or more aspects of the present disclosure.

As illustrated by FIG. 1, processing module 102 may comprise one or more processing cores 106A-106N, a shared cache 108, and a memory controller 110. Processing cores 106A-106N may perform various data processing operations that may utilize data stored in cache 108. Processing cores 106A-106N in various implementations may be provided by in-order cores or out-or-order cores. In an illustrative example, processing core 106A-106N may have a micro-architecture including processor logic and circuits used to implement an instruction set architecture (ISA). Processors with different micro-architectures can share at least a portion of a common instruction set. For example, the same register architecture of the ISA may be implemented in different ways in different micro-architectures using various techniques, including dedicated physical registers, one or more dynamically allocated physical registers using a register renaming mechanism (e.g., the use of a register alias table (RAT), a reorder buffer (ROB) and a retirement register file), as illustrated by FIGS. 5-7. In certain implementations, processing system 100 may also include various other components not shown in FIG. 1.

Cache 108 may comprise local volatile memory to hold data that may be utilized during a data processing operation. In certain implementations, cache 108 may comprise a plurality of separate memory areas organized in levels with the outmost level being the last level cache (LLC).

System 100 may implement a trusted execution environment for protecting, at the micro-architectural level, the applications being executed by the processing system and the data being accessed by the applications. Such a processing system may comprise memory encryption engine (MEE) hardware module 112 for encrypting the data lines which are moved from an on-package memory 116 to a memory which is external with respect to the processor chip (such as the main system memory 104).

In various illustrative examples, processing core 106A may perform data processing operations requiring data secured by a protection system such as SGX. Protected data such as encrypted data lines 124A-124D in memory module 104 may be retrieved by MEE 112 and decrypted prior to being provided to core 106A. Likewise, confidential or otherwise sensitive data generated by core 106A may be encrypted by MEE 112 prior to being stored in memory module 104.

In certain implementations, the data lines may be encrypted using the Advanced Encryption Standard (AES) counter-encryption method, according to which an exclusive OR (XOR) operation may be performed between the data to be encrypted or decrypted and a "cryptopad" generated based on a seed:

Cipher text=Plain text⊕Cryptopad,

Cryptopad=$AES_k$ (Seed), wherein ⊕ denotes exclusive or (XOR) operation, and

AES is an encryption operation based on the Advanced Encryption Standard and k indicates the key size specifying the number of repetitions of transformation rounds that convert the seed into the cryptopad.

Counter-mode encryption requires that the seed be unique spatially and temporarily. Spatial uniqueness of the seed may be derived from the address of the data line, while the temporal uniqueness of the seed may be achieved by using the VER data associated with the data line.

As noted herein above, MEE 112 may implement at least two cryptographic protection mechanisms: encryption to defend against passive attacks and integrity/replay protection to defend against active attacks. Memory encryption is designed to defend against a class of hardware attacks wherein an attacker attempts to silently observe data lines as they move in and out of processing module 102. To defend against these attacks, MEE 112 may employ encryption to protect memory module 104 (e.g., an MEE-specific region in memory module 104). Before a data line moves to memory module 104, it may be encrypted by MEE 112. For reads from memory module 104, encrypted data lines 124A-124D may be decrypted by MEE 112 prior to being delivered to cores 106A-106N.

Integrity and replay protection may involve defending again active attacks to data lines in memory module 104. An active attack may involve changing data stored in memory module 104 to elicit activity in device 100 that would otherwise not have happened.

In certain implementations, for each data line moved to external memory 104, MEE 112 may store a message authentication code (MAC) value associated with it. When the data line is read from external memory 104, its integrity may be verified by calculating the MAC value of the data line and comparing the calculated MAC value with the stored MAC value. Replay protection may be further provided by storing the version (VER) of the data line which is incremented each time when the data line is written back to the external memory.

In certain implementations, processing module 102 may further comprise a MEE cache that may be employed to transparently store copies of the most recently accessed MAC and VER lines such that future requests for those MAC and VER lines may be satisfied more efficiently.

Figure 2A:
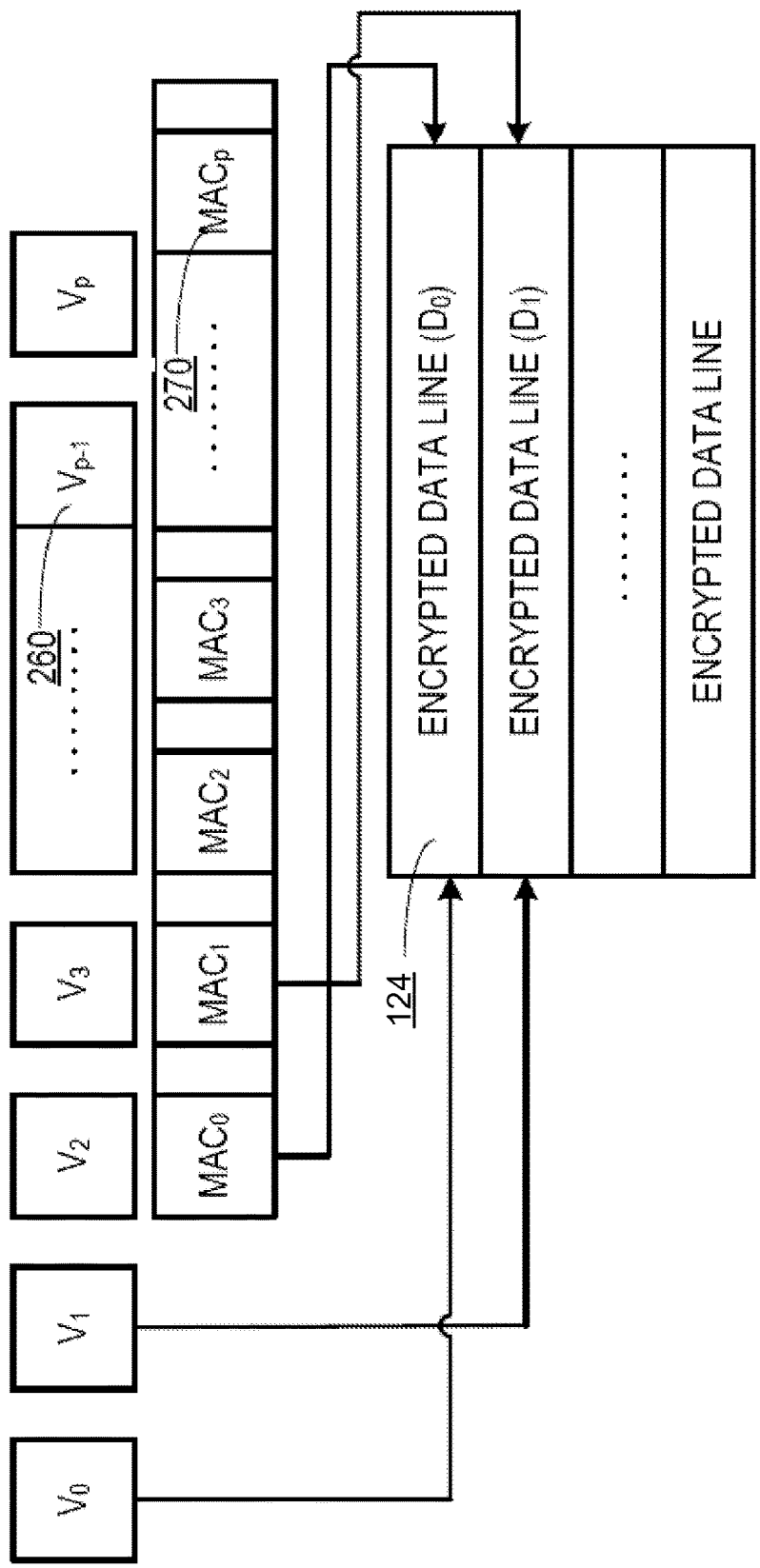
FIGS. 2A-2C schematically illustrate example data structures employed for storing the encryption metadata to implement the integrity and replay protections in accordance with one or more aspects of the present disclosure.
Figure 2B:
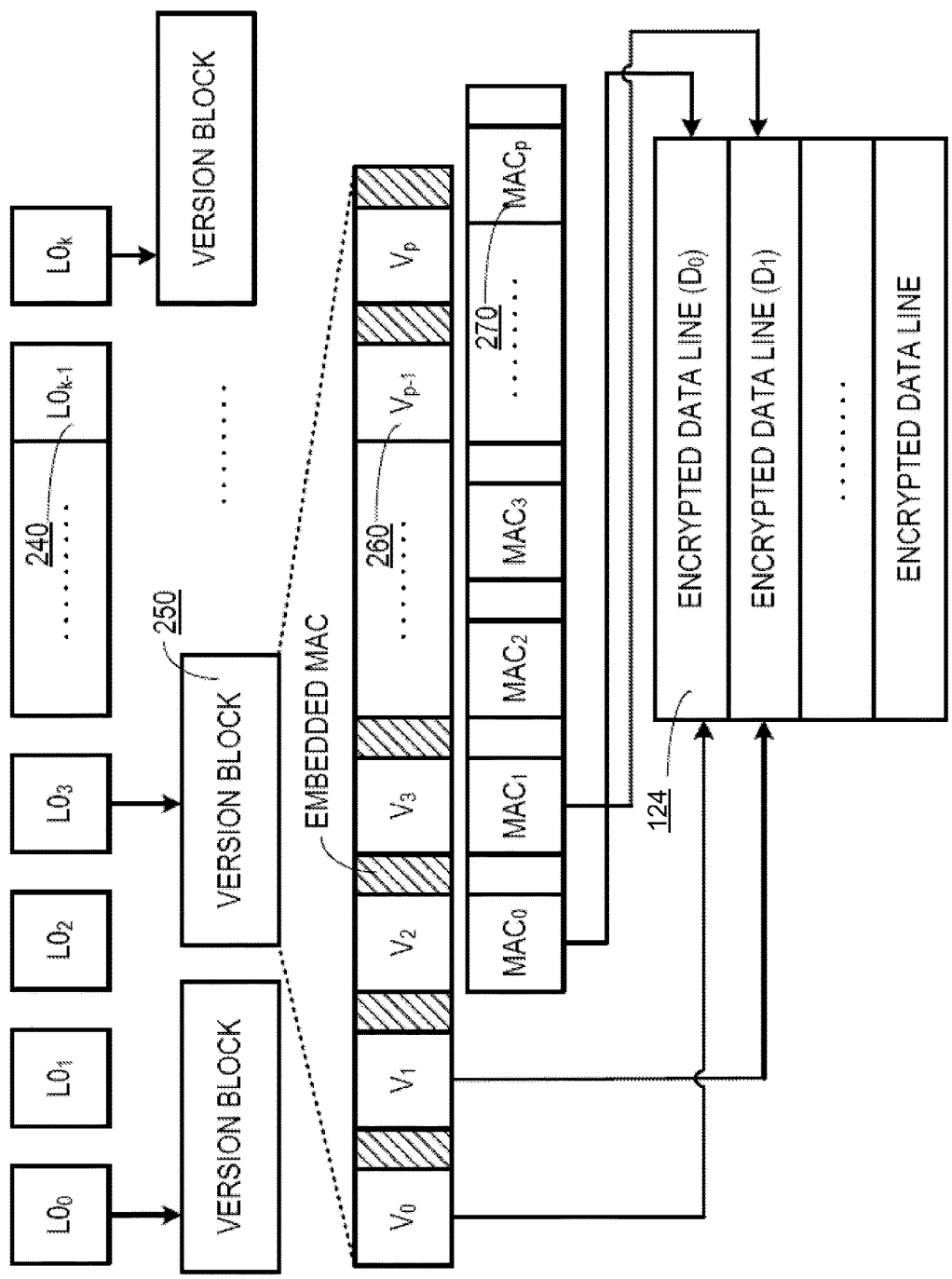
Figure 2C:
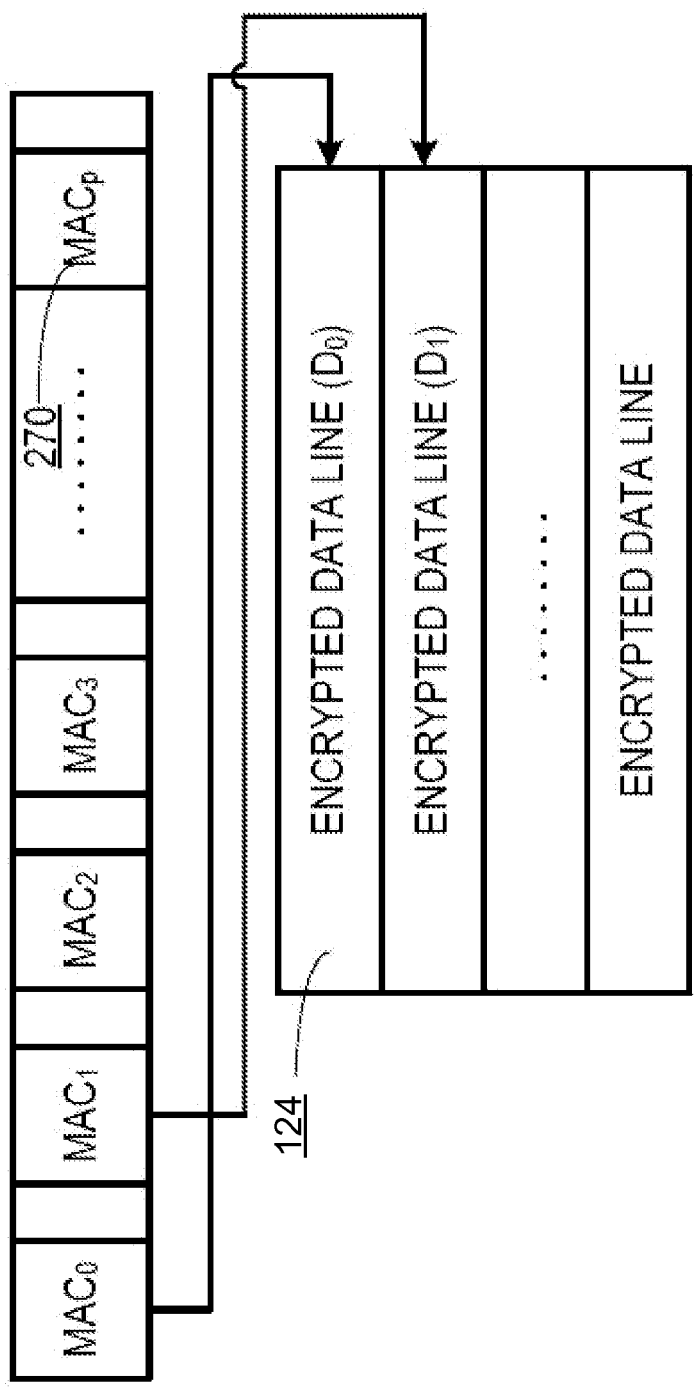

In certain implementations, processing module 102 may further comprise an OPM module 132. In accordance with one or more aspects of the present disclosure, OPM module 132 may be employed as the storage for MAC and/or VER lines, thus eliminating the need for maintaining the replay tree, as schematically illustrated by FIGS. 2A-2C. Various additional elements and features of processing module 102 and/or device 100 are described herein below with references to FIGS. 5-11.

In certain implementations, OPM module 132 may be employed as the storage for both MAC and/or VER lines, thus eliminating the need for maintaining the replay tree, as schematically illustrated by FIG. 2A, which shows an example data structure employed for storing the encryption metadata to implement the integrity and replay protections in accordance with one or more aspects of the present disclosure. As schematically illustrated by FIG. 2A, each encrypted data line 124 is encoded with a MAC node 270 containing a MAC computed from the content of the data line 124. Each time the data line is written back to memory, MEE 112 updates this MAC to reflect the most recent data value stored in memory. When a data line is read from memory, MEE 112 verifies its integrity by calculating the MAC value of the data line and comparing the calculated MAC value with the stored MAC value. Replay protection may be further provided by storing, for each data line, its version (VER) value 260, which is incremented each time when the data line is written back to external memory 104.

When the processor executes a write operation to write one of the encrypted data lines 124 into the protected memory region residing on external memory module 104 (e.g., when evicting a data line from an on-die last level cache to the protected region in the main memory), MEE 112 updates MAC 270 associated with the data line and increments version 260 of that data line.

When the processor executes a read operation with respect to an encrypted data line 124, MEE 112 may check MEE cache 118 for the MAC and VER lines associated with encrypted data line 124. On MEE cache miss, MEE 112 may read the encryption metadata associated with the encryption data line from OPM module 132. MEE 112 may then verify the data line using the associated MAC and VER values, as described in more details herein below with reference to FIG. 3A.

By placing the encryption metadata comprising both MAC and VER lines into OPM module 132, the bandwidth overhead may be dramatically reduced: in an illustrative example, for protecting a 64 GB memory region, the OPM storage having the size of 16 GB size is needed for storing MAC and VER values.

Alternatively, OPM module 132 may be employed as the storage for MAC lines, while VER lines may be stored in external memory 104, thus reducing the size of the replay tree to a single counter level that is stored in OPM module 132, as schematically illustrated by FIG. 2B, which shows another example data structure employed for storing the encryption metadata to implement the integrity and replay protections in accordance with one or more aspects of the present disclosure.

When the processor executes a read operation with respect to an encrypted data line 124, MEE 112 may check MEE cache 118 for the MAC and VER lines associated with encrypted data line 124. On MEE cache miss, MEE 112 may read the MAC value associated with the encryption data line from OPM module 132, and may read the VER value associated with the encryption data line from external memory 104.

MEE 112 may then verify the VER line using an embedded MAC (eMAC) calculated based on the VER line contents and a value of the counter that is stored in OPM module 132. MEE 112 may then verify the data line using the associated MAC and VER values, as described in more details herein below with reference to FIG. 3B.

By placing the encryption metadata comprising MAC lines and counter values OPM module 132, the bandwidth overhead may be dramatically reduced: in an illustrative example, for protecting a 64 GB memory region, the OPM storage having the size of 9 GB is needed for storing the MAC lines and counter values.

Alternatively, OPM module 132 may be employed as the storage for MAC lines, and the need for VER lines may be eliminated by utilizing an alternative encryption/hash scheme (such as XTS-AES or HMAC), as schematically illustrated by FIG. 2C, which shows another example data structure employed for storing the encryption metadata to implement the integrity and replay protections in accordance with one or more aspects of the present disclosure.

XTS-AES is a tweakable block cipher that acts on data units of 128 bits or more and uses the AES block cipher as a subroutine. The key material for XTS-AES comprises a data encryption key (used by the AES block cipher) as well as a tweak key that is used to incorporate the logical position of the data block into the encryption. Certain implementations of XTS-AES may conform to IEEE P1619 standard and/or NIST special publication SP 800-38E.

Keyed-hash message authentication code (HMAC) is a method for calculating a message authentication code (MAC) involving a cryptographic hash function in combination with a secret cryptographic key. Various cryptographic hash functions, such as MD5 or SHA-1, may be used in the calculation of an HMAC; the resulting MAC algorithm is termed HMAC-MD5 or HMAC-SHA1 accordingly.

In certain implementations, an iterative hash function breaks up a message into blocks of a fixed size and iterates over them with a compression function. For example, MD5 and SHA-1 operate on 512-bit blocks. The size of the output of HMAC is the same as that of the underlying hash function (128 or 160 bits in the case of MD5 or SHA-1, respectively), although it can be truncated if desired.

In certain implementation, the HMAC value of a message may be calculated as follows:

$$HMAC(K,m)=H((K\oplus opad)|H(K\oplus ipad)|m))$$

wherein H is a cryptographic hash function,
K is a secret key padded to the right with extra zeroes to the input block size of the hash function,
m is the message to be authenticated,
| denotes concatenation operation,
$\oplus$ denotes exclusive or (XOR) operation,
opad is the outer padding (0x5c5c5c . . . 5c5c, one-block-long hexadecimal constant),
and ipad is the inner padding (0x363636 . . . 3636, one-block-long hexadecimal constant).

When the processor executes a read operation with respect to an encrypted data line 124, MEE 112 may check MEE cache 118 for the MAC line 270 associated with encrypted data line 124. On MEE cache miss, MEE 112 may read the MAC value associated with the encryption data line from OPM module 132. MEE 112 may then verify the data line using the associated MAC and VER values, as described in more details herein below with reference to FIG. 3C.

Figure 3A:
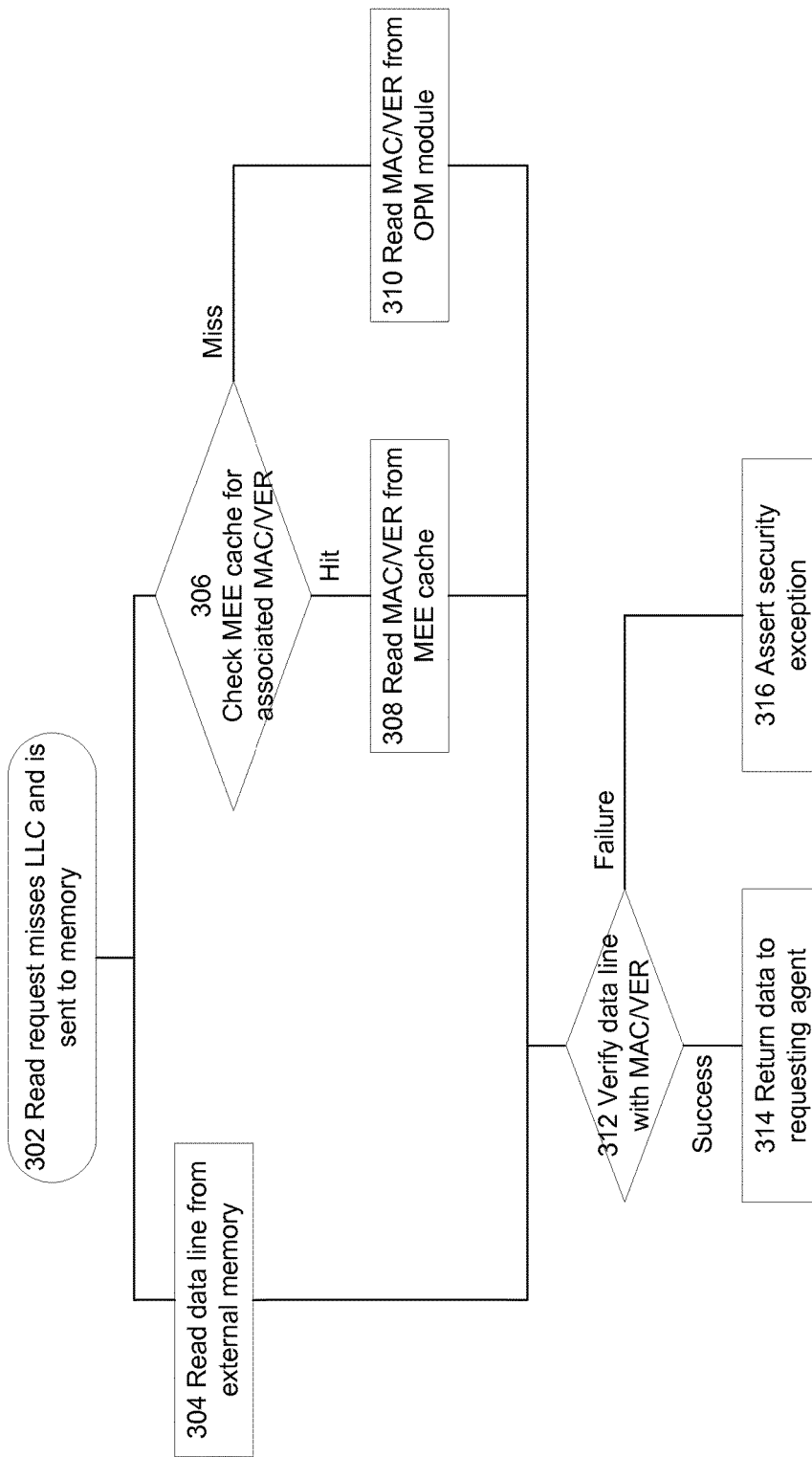
FIGS. 3A-3C depict flow diagrams of example methods for memory protection for implementing trusted execution environment, in accordance with one or more aspects of the present disclosure.

FIG. 3A depicts a flow diagram of an example method 300A for memory protection for implementing trusted execution environment, in accordance with one or more aspects of the present disclosure. Method 300A employs an OPM module as the storage for both MAC and/or VER lines, thus eliminating the need for maintaining the replay tree. Method 300A may be performed by a computer system that may comprise hardware (e.g., circuitry, dedicated logic, and/or programmable logic), software (e.g., instructions executable on a computer system to perform hardware simulation), or a combination thereof. Method 300A and/or each of its functions, routines, subroutines, or operations may be performed by one or more physical processors of the computer system executing the method. Two or more functions, routines, subroutines, or operations of method 300A may be performed in parallel or in an order which may differ from the order described above. In one example, as illustrated by FIG. 3A, method 300A may be performed by the system 100 of FIG. 1.

Referring to FIG. 3A, the method may start at block 302, where a read request with respect to a MEE-protected data line that has missed the last level cache (LLC) is sent to the memory. The processing system implementing the method may, in parallel to reading the data line from the external memory, as schematically illustrated by block 304, attempt to retrieve the encryption metadata (MAC and VER values) associated with the data line from the MEE cache, as schematically illustrated by block 306.

Responsive to determining, at block 306, that the encryption metadata is present in the MEE cache, the processing system may, at block 308, retrieve the MAC and VER values from the MEE cache; otherwise, at block 310, the processing system may retrieve the MAC and VER values from the OPM memory module.

Responsive to successfully retrieving both the data line and the encryption metadata, the processing system may, at block 312, verify the data line using the MAC and VER values. Should the data line be successfully verified, the processing system may, at block 314, return the data line to the requesting agent; otherwise, at block 316, a security exception may be asserted, and the method may terminate.

Figure 3B:
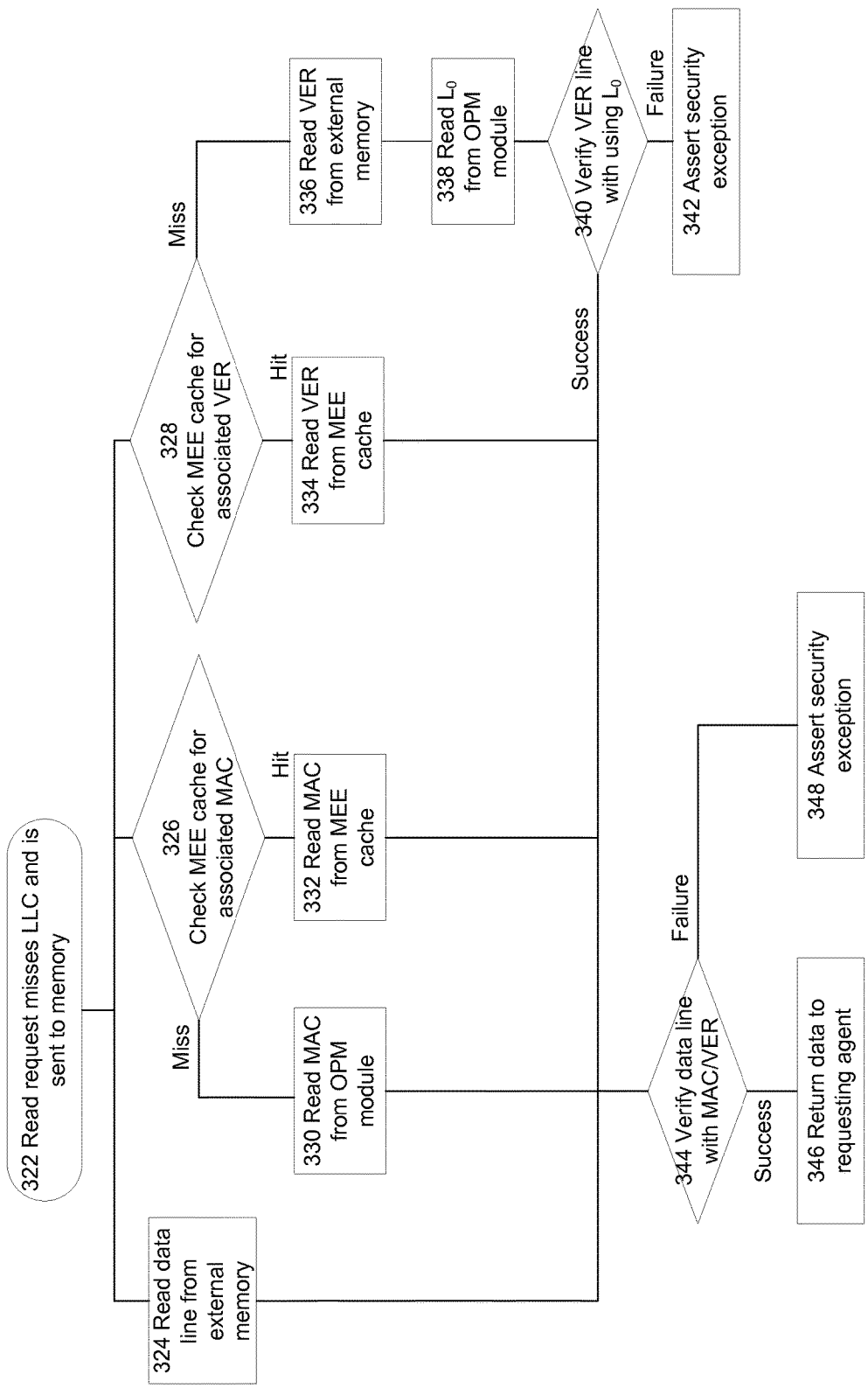

FIG. 3B depicts a flow diagram of an example method 300B for memory protection for implementing trusted execution environment, in accordance with one or more aspects of the present disclosure. Method 300B employs an OPM module as the storage for MAC lines, while VER lines may be stored in the external memory, thus reducing the replay tree to a single counter level. Method 300B may be performed by a computer system that may comprise hardware (e.g., circuitry, dedicated logic, and/or programmable logic), software (e.g., instructions executable on a computer system to perform hardware simulation), or a combination thereof. Method 300B and/or each of its functions, routines, subroutines, or operations may be performed by one or more physical processors of the computer system executing the method. Two or more functions, routines, subroutines, or operations of method 300B may be performed in parallel or in an order which may differ from the order described above. In one example, as illustrated by FIG. 3B, method 300B may be performed by the system 100 of FIG. 1.

Referring to FIG. 3B, the method may start at block 322, where a read request with respect to a MEE-protected data line that has missed the last level cache (LLC) is sent to the memory. The processing system implementing the method may, in parallel to reading the data line from the external memory, as schematically illustrated by block 324, attempt to retrieve the encryption metadata (MAC and VER values) associated with the data line from the MEE cache, as schematically illustrated by blocks 326 and 328.

Responsive to determining, at block 326, that the MAC value is present in the MEE cache, the processing system may, at block 330, retrieve the MAC value from the MEE cache; otherwise, at block 332, the processing system may retrieve the MAC value from the OPM memory module.

Responsive to determining, at block 328, that the VER value is present in the MEE cache, the processing system may, at block 334, retrieve the VER value from the MEE cache; otherwise, at blocks 336-340, the processing system may retrieve the MAC value from the external memory module, read the associated $L_0$ counter value from the OPM module and verify the VER line by computing its eMAC value using the retrieved $L_0$ counter value. Should the VER value be successfully verified, the processing may continue at block 344; otherwise, at block 342, a security exception may be asserted.

Responsive to successfully retrieving both the data line and the encryption metadata, the processing system may, at block 344, verify the data line using the MAC and VER values. Should the data line be successfully verified, the processing system may, at block 346, return the data line to the requesting agent; otherwise, at block 348, a security exception may be asserted, and the method may terminate.

Figure 3C:
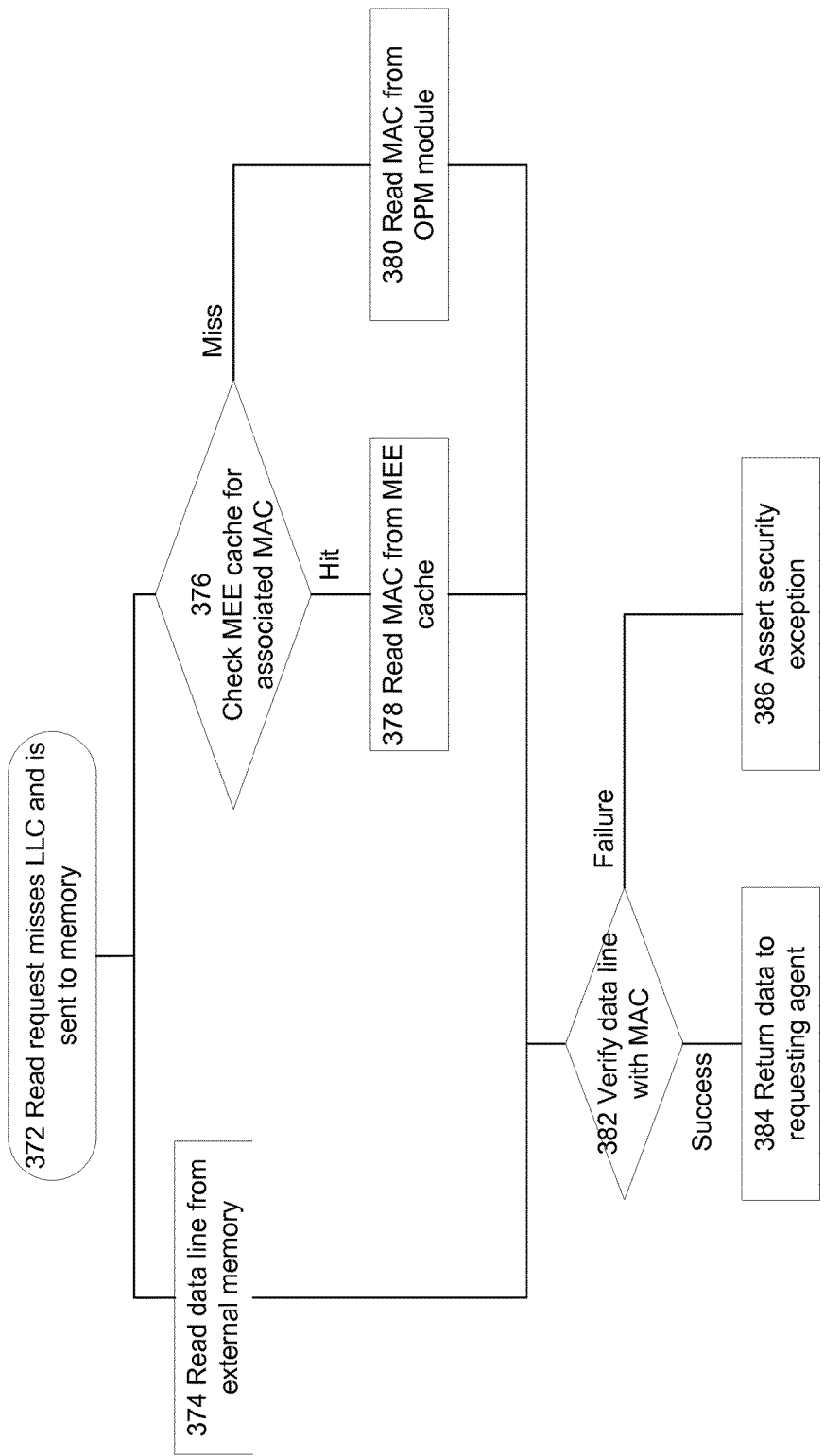

FIG. 3C depicts a flow diagram of an example method 300C for memory protection for implementing trusted execution environment, in accordance with one or more aspects of the present disclosure. Method 300C employs an OPM module as the storage for MAC lines, and eliminates the need for VER lines by utilizing an alternative encryption/hash scheme (such as XTS-AES or HMAC). Method 300C may be performed by a computer system that may comprise hardware (e.g., circuitry, dedicated logic, and/or programmable logic), software (e.g., instructions executable on a computer system to perform hardware simulation), or a combination thereof. Method 300C and/or each of its functions, routines, subroutines, or operations may be performed by one or more physical processors of the computer system executing the method. Two or more functions, routines, subroutines, or operations of method 300C may be performed in parallel or in an order which may differ from the order described above. In one example, as illustrated by FIG. 3C, method 300C may be performed by the system 100 of FIG. 1.

Referring to FIG. 3C, the method may start at block 372, where a read request with respect to a MEE-protected data line that has missed the last level cache (LLC) is sent to the memory. The processing system implementing the method may, in parallel to reading the data line from the external memory, as schematically illustrated by block 374, attempt to retrieve the encryption metadata (MAC value) associated with the data line from the MEE cache, as schematically illustrated by block 376.

Responsive to determining, at block 376, that the MAC value is present in the MEE cache, the processing system may, at block 378, retrieve the MAC value from the MEE cache; otherwise, at block 380, the processing system may retrieve the MAC value from the OPM memory module.

Responsive to successfully retrieving both the data line and the encryption metadata, the processing system may, at block 382, verify the data line using the MAC value. Should the data line be successfully verified, the processing system may, at block 384, return the data line to the requesting agent; otherwise, at block 386, a security exception may be asserted, and the method may terminate.

Although various systems and methods are described herein with reference to specific integrated circuits, such as processors, other implementations may be applicable to other types of integrated circuits and logic devices. Techniques and teachings of systems and methods described herein may be applied to other types of circuits or semiconductor devices that may also benefit from better energy efficiency and energy conservation. For example, the disclosed implementations are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications may include a microcontroller, a digital signal processor (DSP), network computers (NetPC), set-top boxes, network hubs, wide area network (WAN) switches, or any other system that can perform the functions and operations taught below. Moreover, the systems and methods described herein are not limited to physical computing devices, but may also relate to software-implemented methods. Power savings realized by systems and methods described herein may be independent of and complementary to an operating system (OS)-based mechanism, such as the Advanced Configuration and Platform Interface (ACPI) standard.

The methods and systems described herein above may be implemented by computer system of various architectures, designs and configurations for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable to implement the methods described herein. In general, a large variety of systems or electronic devices capable of incorporating a processor and/or other execution logic as disclosed herein are generally suitable for implementing the systems and methods described herein.

Figure 4:
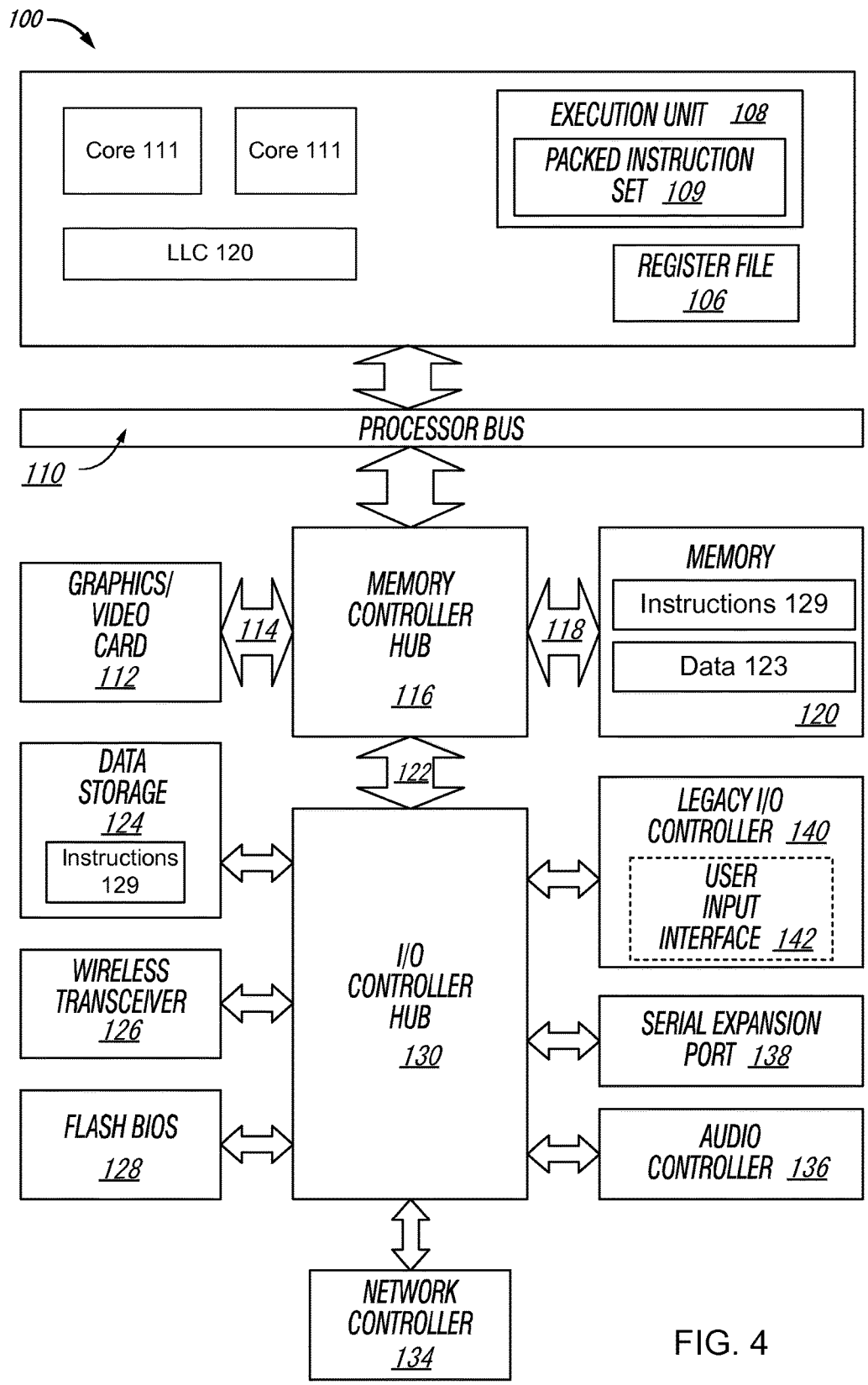
FIG. 4 depicts a high-level component diagram of an example computer system, in accordance with one or more aspects of the present disclosure.

FIG. 4 depicts a high-level component diagram of one example of a computer system in accordance with one or more aspects of the present disclosure. A computer system 100 may include a processor 110 to employ execution units including logic to perform algorithms for processing data, in accordance with the embodiment described herein. System 100 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In certain implementations, sample system 100 executes a version of the WINDOWS™ operating system available from Microsoft Corporation of Redmond, Wash., although other operating systems (UNIX and Linux for example), embedded software, and/or graphical user interfaces, may also be used. Thus, embodiments described herein are not limited to any specific combination of hardware circuitry and software.

In an illustrative example, processor 110 includes one or more execution units 108 to implement an algorithm that is to perform at least one instruction. One embodiment may be described in the context of a single processor desktop or server system, but alternative embodiments may be included in a multiprocessor system. System 100 is an example of a 'hub' system architecture. The computer system 100 includes a processor 110 to process data signals. The processor 110, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 110 is coupled to a processor bus 110 that transmits data signals between the processor 110 and other components in the system 100. The elements of system 100 (e.g. graphics accelerator 112, memory controller hub 116, memory 120, I/O controller hub 124, wireless transceiver 126, Flash BIOS 128, Network controller 134, Audio controller 136, Serial expansion port 138, I/O controller 140, etc.) perform their conventional functions that are well known to those familiar with the art.

In certain implementations, the processor 110 includes a Level 1 (L1) internal cache. Depending on the architecture, the processor 110 may have a single internal cache or multiple levels of internal caches. Other embodiments include a combination of both internal and external caches depending on the particular implementation and needs. Register file 106 is to store different types of data in various registers including integer registers, floating point registers, vector registers, banked registers, shadow registers, checkpoint registers, status registers, and instruction pointer register.

Execution unit 108, including logic to perform integer and floating point operations, also resides in the processor 110. The processor 110, in certain implementations, includes a microcode (ucode) ROM to store microcode, which when executed, is to perform algorithms for certain macroinstructions or handle complex scenarios. Here, microcode is potentially updateable to handle logic bugs/fixes for processor 110. For one embodiment, execution unit 108 includes logic to handle a packed instruction set 109. By including the packed instruction set 109 in the instruction set of a general-purpose processor 110, along with associated circuitry to execute the instructions, the operations used by many multimedia applications may be performed using packed data in a general-purpose processor 110. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time. Alternate embodiments of an execution unit 108 may also be used in micro controllers, embedded processors, graphics devices, DSPs, and other types of logic circuits. In certain implementations, the processor 110 may further include a cache control logic 124, the functioning of which is described in more details herein below.

System 100 includes a memory 120. Memory 120 includes a dynamic random access memory (DRAM) device, a static random access memory (SRAM) device, flash memory device, or other memory device. Memory 120 stores instructions 129 and/or data 123 represented by data signals that are to be executed by the processor 110. In certain implementations, instructions 129 may include instructions employing the cache control logic 124 for managing shared cache, as described in more details herein below.

A system logic chip 116 is coupled to the processor bus 110 and memory 120. The system logic chip 116 in the illustrated embodiment is a memory controller hub (MCH). The processor 110 can communicate to the MCH 116 via a processor bus 110. The MCH 116 provides a high bandwidth memory path 118 to memory 120 for instruction and data storage and for storage of graphics commands, data and textures. The MCH 116 is to direct data signals between the processor 110, memory 120, and other components in the system 100 and to bridge the data signals between processor bus 110, memory 120, and system I/O 122. In some embodiments, the system logic chip 116 can provide a graphics port for coupling to a graphics controller 112. The MCH 116 is coupled to memory 120 through a memory interface 118. The graphics card 112 is coupled to the MCH 116 through an Accelerated Graphics Port (AGP) interconnect 114.

System 100 uses a proprietary hub interface bus 122 to couple the MCH 116 to the I/O controller hub (ICH) 130. The ICH 130 provides direct connections to some I/O devices via a local I/O bus. The local I/O bus is a high-speed I/O bus for connecting peripherals to the memory 120, chipset, and processor 110. Some examples are the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. The data storage device 124 can comprise a hard disk drive, a floppy disk drive, a CD-ROM device, a flash memory device, or other mass storage device.

For another embodiment of a system, an instruction in accordance with one embodiment can be used with a system on a chip. One embodiment of a system on a chip comprises of a processor and a memory. The memory for one such system is a flash memory. The flash memory can be located on the same die as the processor and other system components. Additionally, other logic blocks such as a memory controller or graphics controller can also be located on a system on a chip.

FIG. 5 is a block diagram of the micro-architecture for a processor 200 that includes logic circuits to perform instructions in accordance with one or more aspects of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In certain implementations the in-order front end 201 is the part of the processor 200 that fetches instructions to be executed and prepares them to be used later in the processor pipeline. The front end 201 may include several units. In certain implementations, the instruction prefetcher 226 fetches instructions from memory and feeds them to an instruction decoder 228 which in turn decodes or interprets them. For example, in certain implementations, the decoder decodes a received instruction into one or more operations called "micro-instructions" or "micro-operations" (also referred to as uops) that the machine can execute. In other embodiments, the decoder parses the instruction into an opcode and corresponding data and control fields that are used by the micro-architecture to perform operations in accordance with one embodiment. In certain implementations, the trace cache 230 takes decoded uops and assembles them into program ordered sequences or traces in the uop queue 234 for execution. When the trace cache 230 encounters a complex instruction, the microcode ROM 232 provides the uops needed to complete the operation.

Some instructions are converted into a single micro-op, whereas others need several micro-ops to complete the full operation. In certain implementations, if more than four micro-ops are needed to complete an instruction, the decoder 228 accesses the microcode ROM 232 to do the instruction. For one embodiment, an instruction can be decoded into a small number of micro ops for processing at the instruction decoder 228. In another embodiment, an instruction can be stored within the microcode ROM 232 should a number of micro-ops be needed to accomplish the operation. The trace cache 230 refers to an entry point programmable logic array (PLA) to determine a correct micro-instruction pointer for reading the micro-code sequences to complete one or more instructions in accordance with one embodiment from the micro-code ROM 232. After the microcode ROM 232 finishes sequencing micro-ops for an instruction, the front end 201 of the machine resumes fetching micro-ops from the trace cache 230.

The out-of-order execution engine 203 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register aliasing logic maps logical registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. The uop schedulers 202, 204, 206 determine when a uop is ready to execute based on the readiness of their dependent input register operand sources and the availability of the execution resources the uops need to complete their operation. The fast scheduler 202 of one embodiment can schedule on each half of the main clock cycle while the other schedulers can schedule once per main processor clock cycle. The schedulers arbitrate for the dispatch ports to schedule uops for execution.

Physical register files 208, 210 sit between the schedulers 202, 204, 206, and the execution units 212, 214, 216, 218, 220, 222, 224 in the execution block 211. There is a separate register file 208, 210 for integer and floating point operations, respectively. Each register file 208, 210, of one embodiment also includes a bypass network that can bypass or forward just completed results that have not yet been written into the register file to new dependent uops. The integer register file 208 and the floating point register file 210 are also capable of communicating data with the other. For one embodiment, the integer register file 208 is split into two separate register files, one register file for the low order 32 bits of data and a second register file for the high order 32 bits of data. The floating point register file 210 of one embodiment has 128 bit wide entries because floating point instructions typically have operands from 64 to 128 bits in width.

The execution block 211 contains the execution units 212, 214, 216, 218, 220, 222, 224, where the instructions are actually executed. This section includes the register files 208, 210, that store the integer and floating point data operand values that the micro-instructions need to execute. The processor 200 of one embodiment is comprised of a number of execution units: address generation unit (AGU) 212, AGU 214, fast ALU 216, fast ALU 218, slow ALU 220, floating point ALU 222, floating point move unit 224. For one embodiment, the floating point execution blocks 222, 224, execute floating point, MMX, SIMD, and SSE, or other operations. The floating point ALU 222 of one embodiment includes a 64 bit by 64 bit floating point divider to execute divide, square root, and remainder micro-ops. For systems and methods described herein, instructions involving a floating point value may be handled with the floating point hardware. In certain implementations, the ALU operations go to the high-speed ALU execution units 216, 218. The fast ALUs 216, 218, of one embodiment can execute fast operations with an effective latency of half a clock cycle. For one embodiment, most complex integer operations go to the slow ALU 220 as the slow ALU 220 includes integer execution hardware for long latency type of operations, such as a multiplier, shifts, flag logic, and branch processing. Memory load/store operations are executed by the AGUs 212, 214. For one embodiment, the integer ALUs 216, 218, 220 are described in the context of performing integer operations on 64 bit data operands. In alternative embodiments, the ALUs 216, 218, 220 can be implemented to support a variety of data bits including 16, 32, 128, 256, etc. Similarly, the floating point units 222, 224 can be implemented to support a range of operands having bits of various widths. For one embodiment, the floating point units 222, 224 can operate on 128 bits wide packed data operands in conjunction with SIMD and multimedia instructions.

In certain implementations, the uops schedulers 202, 204, 206 dispatch dependent operations before the parent load has finished executing. As uops are speculatively scheduled and executed in processor 200, the processor 200 also includes logic to handle memory misses. If a data load misses in the data cache, there can be dependent operations in flight in the pipeline that have left the scheduler with temporarily incorrect data. A replay mechanism tracks and re-executes instructions that use incorrect data. The dependent operations should be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register aliasing, combinations of dedicated and dynamically allocated physical registers, etc. In certain implementations, integer registers store thirty-two bit integer data. A register file of one embodiment also contains eight multimedia SIMD registers for packed data. For the discussions below, the registers are understood to be data registers designed to hold packed data, such as 64 bits wide MMX registers (also referred to as 'mm' registers in some instances) in microprocessors enabled with the MMX™ technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In certain implementations, in storing packed data and integer data, the registers do not need to differentiate between the two data types. In certain implementations, integer and floating point are either contained in the same register file or different register files. Furthermore, in certain implementations, floating point and integer data may be stored in different registers or the same registers.

FIGS. 6A-6B schematically illustrates elements of a processor micro-architecture, in accordance with one or more aspects of the present disclosure. In FIG. 6A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

In FIG. 6B, arrows denote a coupling between two or more units and the direction of the arrow indicates a direction of data flow between those units. FIG. 6B shows processor core 111 including a front end unit 430 coupled to an execution engine unit 450, and both are coupled to a memory unit 470.

The core 111 may be a reduced instruction set computing (RISC) core, a complex instruction set computing (CISC) core, a very long instruction word (VLIW) core, or a hybrid or alternative core type. As yet another option, the core 111 may be a special-purpose core, such as, for example, a network or communication core, compression engine, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 434 is further coupled to a level 2 (L2) cache unit 476 in the memory unit 470. The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 458 is overlapped by the retirement unit 454 to illustrate various ways in which register aliasing and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register aliasing, combinations of dedicated and dynamically allocated physical registers, etc. The retirement unit 454 and the physical register file(s) unit(s) 458 are coupled to the execution cluster(s) 460. The execution cluster(s) 460 includes a set of one or more execution units 162 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The L2 cache unit 476 is coupled to one or more other levels of cache and eventually to a main memory.

By way of example, the exemplary register aliasing, out-of-order issue/execution core architecture may implement the pipeline 400 as follows: the instruction fetch 438 performs the fetch and length decoding stages 402 and 404; the decode unit 440 performs the decode stage 406; the rename/allocator unit 452 performs the allocation stage 408 and renaming stage 410; the scheduler unit(s) 456 performs the schedule stage 412; the physical register file(s) unit(s) 458 and the memory unit 470 perform the register read/memory read stage 414; the execution cluster 460 perform the execute stage 416; the memory unit 470 and the physical register file(s) unit(s) 458 perform the write back/memory write stage 418; various units may be involved in the exception handling stage 422; and the retirement unit 454 and the physical register file(s) unit(s) 458 perform the commit stage 424.

The core 111 may support one or more instructions sets (e.g., the x86 instruction set (with some extensions that have been added with newer versions); the MIPS instruction set of MIPS Technologies of Sunnyvale, Calif.; the ARM instruction set (with additional extensions such as NEON) of ARM Holdings of Sunnyvale, Calif.).

In certain implementations, the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register aliasing is described in the context of out-of-order execution, it should be understood that register aliasing may be used in an in-order architecture. While the illustrated embodiment of the processor also includes a separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

In certain implementations, processor core 111 may be designed as an out-of-order (OOO) core in order to improve the performance by executing instructions as soon as their operands become available, rather than in the program order. However, the performance benefit may be offset by a considerable increase in the power consumption. When multiple execution threads are available for the operating system to schedule, employing multiple in-order cores rather than large OOO cores may improve the energy consumption profile of the processor without compromising the overall performance. Thus, to improve the performance and energy consumption scalability of a processor, the latter may be designed to support a variable number of cores depending on the performance needs and the number of threads available to the operating system for scheduling.

FIG. 7 depicts a block diagram of an example computer system, in accordance with one or more aspects of the present disclosure. As shown in FIG. 7, multiprocessor system 700 is a point-to-point interconnect system, and includes a first processor 770 and a second processor 780 coupled via a point-to-point interconnect 750. Each of processors 770 and 780 may be some version of processing system 100 capable of performing memory protection for implementing trusted execution environment, as described in more details herein above. While shown with only two processors 770, 780, it is to be understood that the scope of the present disclosure is not so limited. In other embodiments, one or more additional processors may be present in the example computer system.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In certain implementations, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In certain implementations, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in certain implementations. Further, an audio I/O 724 may be coupled to second bus 720.

Figure 8:
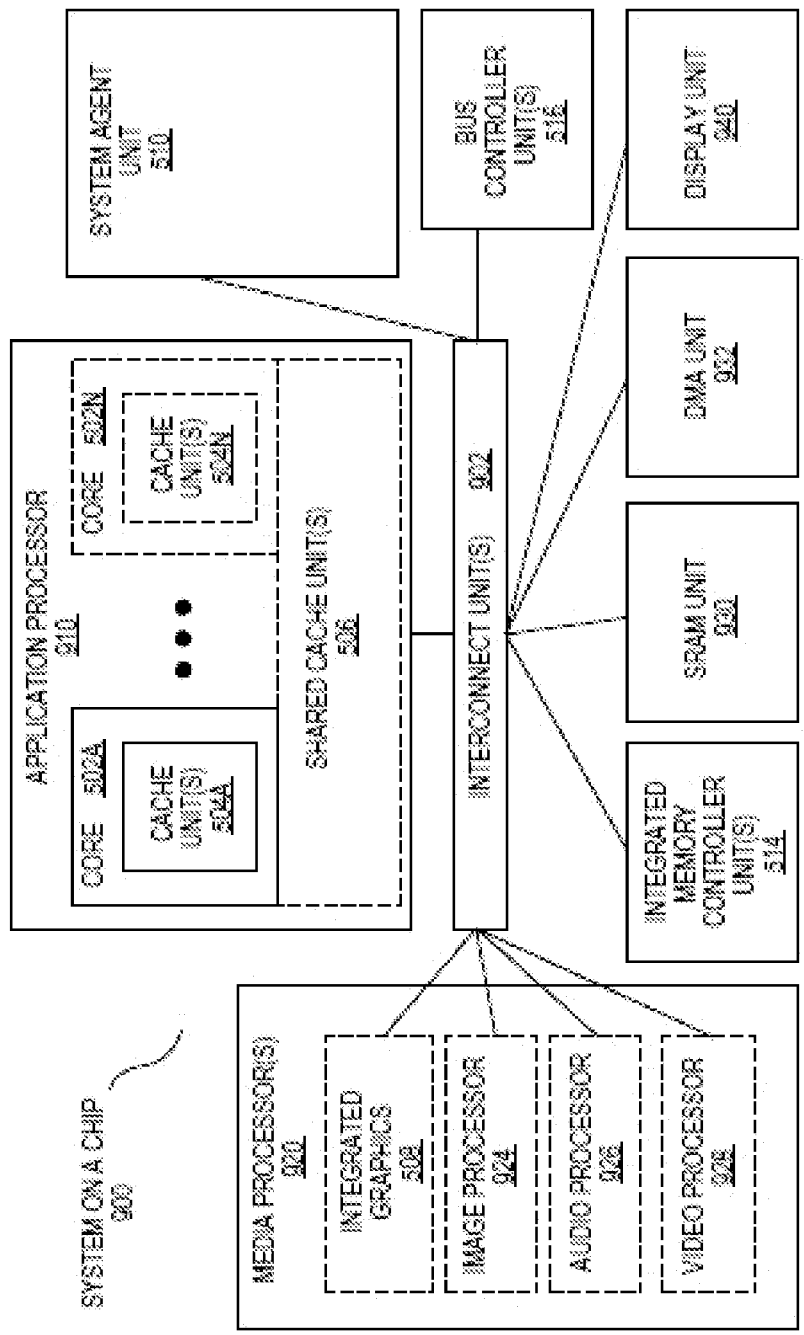
FIG. 8 depicts a block diagram of an example system on a chip (SoC), in accordance with one or more aspects of the present disclosure.

FIG. 8 depicts a block diagram of an example system on a chip (SoC), in accordance with one or more aspects of the present disclosure. The application processor 910 provided by some version of processing system 100 capable of performing memory protection for implementing trusted execution environment, as described in more details herein above. As schematically illustrated by FIG. 8, interconnect unit(s) 902 may be coupled to: an application processor 910 which includes a set of one or more cores 902A-N and shared cache unit(s) 906; a system agent unit 910; a bus controller unit(s) 916; an integrated memory controller unit(s) 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 9:
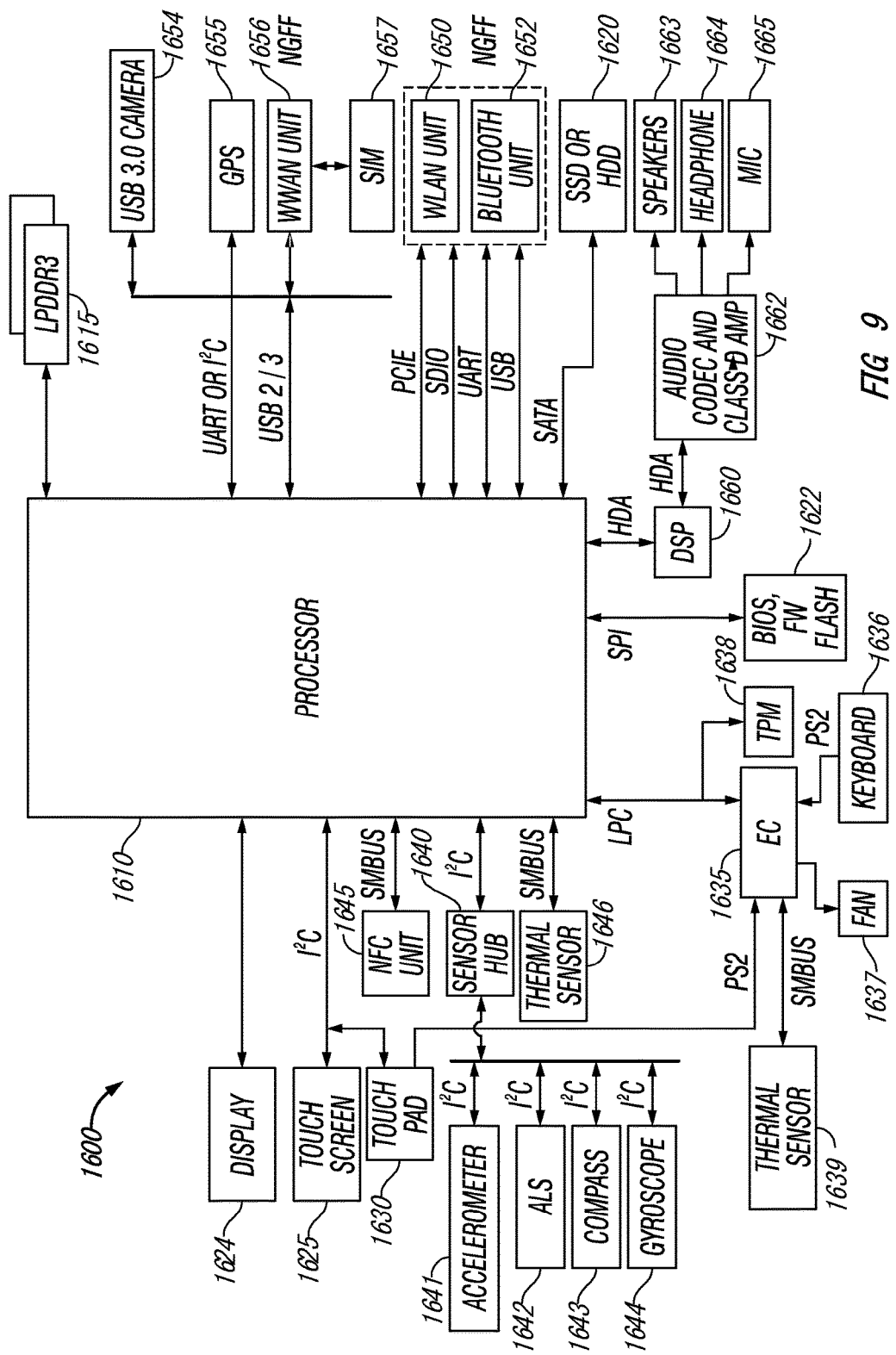
FIG. 9 depicts a block diagram of an example computer system, in accordance with one or more aspects of the present disclosure.

FIG. 9 depicts a block diagram of an example computer system, in accordance with one or more aspects of the present disclosure. Processor 1610 may be provided by some version of processing system 100 capable of performing memory protection for implementing trusted execution environment, as described in more details herein above.

The system 1600 schematically illustrated by FIG. 9 may include any combination of components implemented as ICs, portions thereof, discrete electronic devices, or other modules, logic, hardware, software, firmware, or a combination thereof adapted in a computer system, or as components otherwise incorporated within a chassis of the computer system. The block diagram of FIG. 9 is intended to show a high level view of many components of the computer system. However, it is to be understood that some of the components shown may be omitted, additional components may be present, and different arrangement of the components shown may occur in other implementations.

Processor 1610 may be provided by a microprocessor, multi-core processor, multithreaded processor, an ultra low voltage processor, an embedded processor, or other known processing element. In the illustrated implementation, processor 1610 acts as a main processing unit and central hub for communication with many of the various components of the system 1600. As one example, processor 1600 may be implemented as a system on a chip (SoC). As a specific illustrative example, processor 1610 includes an Intel® Architecture Core™-based processor such as an i3, i5, i7 or another such processor available from Intel Corporation, Santa Clara, Calif.

Processor 1610 may communicate with a system memory 1615. In various implementations the individual memory devices may be of different package types such as single die package (SDP), dual die package (DDP) or quad die package (1P). These devices, in some implementations, may be directly soldered onto a motherboard to provide a lower profile solution, while in other implementations the devices may be configured as one or more memory modules that in turn couple to the motherboard by a given connector. Other memory implementations are possible, such as other types of memory modules, e.g., dual inline memory modules (DIMMs) of different varieties including but not limited to microDIMMs, MiniDIMMs. In one illustrative example, the memory may be sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1620 may be also coupled to processor 1610. In certain implementations, to enable a thinner and lighter system design as well as to improve system responsiveness, the mass storage 1620 may be implemented via a SSD. In other implementations, the mass storage may primarily be provided by a hard disk drive (HDD) with a smaller amount of SSD storage to act as a SSD cache to enable non-volatile storage of context state and other such information during power down events so that a fast power up can occur on re-initiation of system activities.

Also shown in FIG. 9, a flash device 1622 may be coupled to processor 1610, e.g., via a serial peripheral interface (SPI). The flash device 1622 may provide for non-volatile storage of system software, including a basic input/output software (BIOS) as well as other firmware of the system.

In various implementations, the mass storage of the system may be provided by a SSD alone or as a disk, optical or other drive with an SSD cache. In some implementations, the mass storage may be provided by an SSD or as a HDD along with a restore (RST) cache module. The SSD cache may be configured as a single level cache (SLC) or multi-level cache (MLC) option to provide an appropriate level of responsiveness.

Various input/output (IO) devices may be present within system 1600, including, e.g., a display 1624 which may be provided by a high definition LCD or LED panel configured within a lid portion of the chassis. This display panel may also provide for a touch screen 1625 adapted externally over the display panel such that via a user's interaction with this touch screen, user inputs can be provided to the system to enable desired operations, e.g., with regard to the display of information, accessing of information and so forth. In certain implementations, display 1624 may be coupled to processor 1610 via a display interconnect that can be implemented as a high performance graphics interconnect. Touch screen 1625 may be coupled to processor 1610 via another interconnect, which in an embodiment can be an I2C interconnect. In addition to touch screen 1625, user input by way of touch can also occur via a touch pad 1630 which may be configured within the chassis and may also be coupled to the same I2C interconnect as touch screen 1625.

Various sensors may be present within the system and may be coupled to processor 1610 in different manners. Certain inertial and environmental sensors may couple to processor 1610 through a sensor hub 1640, e.g., via an I2C interconnect. These sensors may include an accelerometer 1641, an ambient light sensor (ALS) 1642, a compass 1643 and a gyroscope 1644. Other environmental sensors may include one or more thermal sensors 1646 which in some embodiments couple to processor 1610 via a system management bus (SMBus) bus. In certain implementations, one or more infrared or other heat sensing elements, or any other element for sensing the presence or movement of a user may be present.

Various peripheral devices may couple to processor 1610 via a low pin count (LPC) interconnect. In certain implementations, various components can be coupled through an embedded controller 1635. Such components can include a keyboard 1636 (e.g., coupled via a PS2 interface), a fan 1637, and a thermal sensor 1639. In some embodiments, touch pad 1630 may also couple to EC 1635 via a PS2 interface. In addition, a security processor such as a trusted platform module (TPM) 1638 in accordance with the Trusted Computing Group (TCG) TPM Specification Version 1.2, dated Oct. 2, 2003, may also couple to processor 1610 via this LPC interconnect.

In certain implementations, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1600 can communicate with external devices in a variety of manners, including wirelessly. In the embodiment shown in FIG. 16, various wireless modules, each of which can correspond to a radio configured for a particular wireless communication protocol, are present. One manner for wireless communication in a short range such as a near field may be via a near field communication (NFC) unit 1645 which may communicate, in certain implementations with processor 1610 via an SMBus.

Additional wireless units can include other short range wireless engines including a WLAN unit 1650 and a Bluetooth unit 1652. Using WLAN unit 1650, Wi-Fi™ communications in accordance with a given Institute of Electrical and Electronics Engineers (IEEE) 802.11 standard can be realized, while via Bluetooth unit 1652, short range communications via a Bluetooth protocol can occur. These units may communicate with processor 1610 via, e.g., a USB link or a universal asynchronous receiver transmitter (UART) link. Or these units may couple to processor 1610 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1656 which in turn may couple to a subscriber identity module (SIM) 1657. In addition, to enable receipt and use of location information, a GPS module 1655 may also be present.

To provide for audio inputs and outputs, an audio processor can be implemented via a digital signal processor (DSP) 1660, which may couple to processor 1610 via a high definition audio (HDA) link. Similarly, DSP 1660 may communicate with an integrated coder/decoder (CODEC) and amplifier 1662 that in turn may couple to output speakers 1663 which may be implemented within the chassis. Similarly, amplifier and CODEC 1662 can be coupled to receive audio inputs from a microphone 1665.

Figure 10:
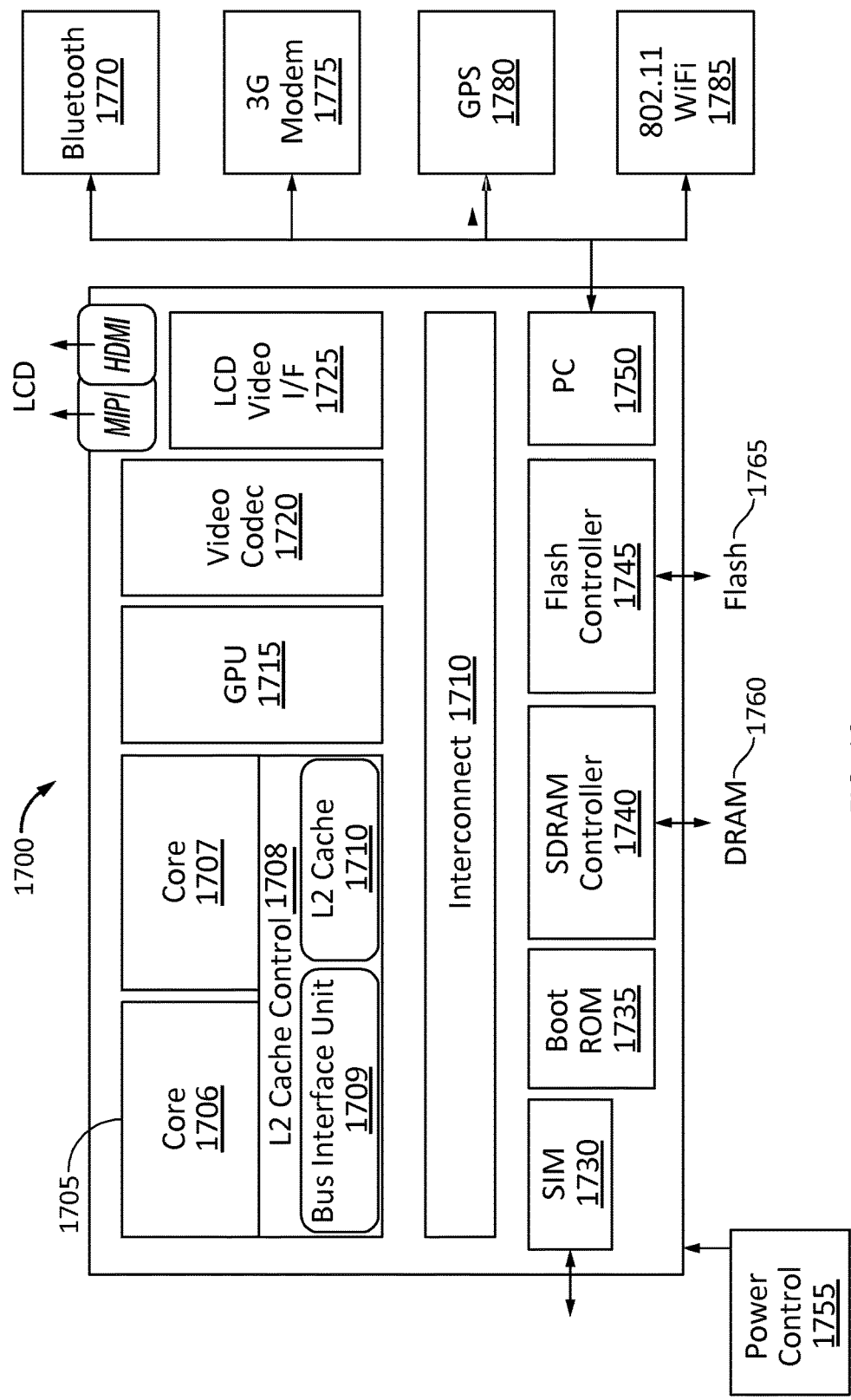
FIG. 10 depicts a block diagram of an example system on a chip (SoC), in accordance with one or more aspects of the present disclosure.

FIG. 10 depicts a block diagram of an example system on a chip (SoC), in accordance with one or more aspects of the present disclosure. As a specific illustrative example, SOC 1700 may be included in user equipment (UE). In certain implementations, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

As schematically illustrated by FIG. 10, SOC 1700 may include two cores. Cores 1706 and 1707 may be coupled to cache control 1708 that is associated with bus interface unit 1709 and L2 cache 1710 to communicate with other parts of system 1700. Interconnect 1710 may include an on-chip interconnect, such as an IOSF, AMBA, or other interconnect.

Interface 1710 may provide communication channels to the other components, such as a Subscriber Identity Module (SIM) 1730 to interface with a SIM card, a boot ROM 1735 to hold boot code for execution by cores 1706 and 1707 to initialize and boot SOC 1700, a SDRAM controller 1740 to interface with external memory (e.g., DRAM 1760), a flash controller 1745 to interface with non-volatile memory (e.g., flash 1765), a peripheral control 1550 (e.g., Serial Peripheral Interface) to interface with peripherals, video codecs 1720 and Video interface 1725 to display and receive input (e.g., touch enabled input), GPU 1715 to perform graphics related computations, etc. In addition, the system may comprise peripherals for communication, such as a Bluetooth module 1770, 3G modem 1775, GPS 1785, and WiFi 1785.

Other computer system designs and configurations may also be suitable to implement the systems and methods described herein. The following examples illustrate various implementations in accordance with one or more aspects of the present disclosure.

Example 1 is a processing system, comprising: an on-package memory; a memory encryption engine (MEE) comprising a MEE cache, the MEE to: responsive to failing to locate, within the MEE cache, an encryption metadata associated with a data item loaded from an external memory, retrieve at least part of the encryption metadata from the OPM, and validate the data item using the encryption metadata.

Example 2 is the processing system of Example 1, wherein the MEE is to: responsive to detecting that the data item is being moved from the OPM to an external memory, encrypt the data item; and store at least part of the encryption metadata in the OPM.

Example 3 is the processing system of Example 2, wherein the MEE is to encrypt the data item using an Advanced Encryption Standard (AES) counter-encryption method.

Example 4 is the processing system of any of Examples 1-3, wherein the MEE is further to: retrieve a first part of the encryption metadata from the OPM and retrieve a second part of the encryption metadata item from the external memory.

Example 5 is the processing system of any of Examples 1-4, wherein the encryption metadata comprises at least one of: a message authentication code (MAC), a version information (VER), and a counter value.

Example 6 is the processing system of Example 5, wherein the MEE is to: retrieve the message authentication code (MAC) and the version information (VER) from the OPM.

Example 7 is the processing system of Example 5, wherein the MEE is to: retrieve the message authentication code (MAC) and the counter value from the OPM; and retrieve the version information (VER) from the external memory.

Example 8 is the processing system of Example 5, wherein the MEE is to: retrieve the message authentication code (MAC) from the OPM.

Example 9 is the processing system of Example 8, wherein validating the data item is performed using a keyed-hash message authentication code (HMAC) encryption scheme.

Example 10 is the processing system of Example 8, wherein validating the data item is performed using an XTS-AES encryption scheme.

Example 11 is the processing system of any of Examples 1-10, further comprising: a processing core; and a memory controller operatively coupled to the processing core.

Example 12 is the processing system of any of Examples 1-11, wherein the processing system is represented by a System-on-Chip (SoC).

Example 13 is a method, comprising: receiving a memory read request; retrieving a data item from an external memory; retrieving, from an on-package memory, encryption metadata comprising a message authentication code (MAC) and a version information (VER) associated with the data item; and validating the data item using the MAC and the VER.

Example 14 is the method of Example 13, wherein retrieving the data item from the external memory is performed in parallel with retrieving the encryption metadata from the on-package memory.

Example 15 is the method of any of Examples 13-14, wherein retrieving the data item from the external memory is preformed responsive to failing to retrieve the data item from a last level cache.

Example 16 is the method of any of Examples 13-15, wherein retrieving the encryption metadata from the on-package memory is performed responsive to failing to retrieve the encryption metadata from an MEE cache.

Example 17 is the method of Example 13, further comprising: responsive to detecting that the data item is being moved from the OPM to an external memory, encrypting the data item; and determining the MAC of the data item; incrementing the VER associated with the data item; storing, in the OPM, encryption metadata comprising the MAC and the VER.

Example 18 is the method of Example 17, wherein encrypting the data item is performed using an Advanced Encryption Standard (AES) counter-encryption method.

Example 19 is the method of Example 17, wherein encrypting the data item is performed using an Advanced Encryption Standard (AES) counter-encryption method.

Example 20 is an apparatus comprising: a memory; and a processing system coupled to the memory, the processing system to perform the method of any of Examples 13-19.

Example 21 is a method, comprising: receiving a memory read request; retrieving a data item from an external memory; retrieving, from an on-package memory, encryption metadata comprising a message authentication code (MAC) associated with the data item; retrieving a version information (VER) associated with the data item from an external memory; and validating the data item using the MAC and the VER.

Example 22 is the method of Example 21, wherein retrieving the data item from the external memory is performed in parallel with retrieving the encryption metadata from the on-package memory.

Example 23 is the method of any of Examples 21-22, wherein retrieving the data item from the external memory is preformed responsive to failing to retrieve the data item from a last level cache.

Example 24 is the method of any of Examples 21-23, further comprising: responsive to detecting that the data item is being moved from the OPM to an external memory, encrypting the data item; determining the MAC of the data item; incrementing the VER associated with the data item; storing the MAC in the OPM; incrementing the VER; and storing the VER in the external memory.

Example 25 is the method of Example 24, wherein encrypting the data item is performed using an Advanced Encryption Standard (AES) counter-encryption method.

Example 26 is an apparatus comprising: a memory; and a processing system coupled to the memory, the processing system to perform the method of any of Examples 21-25.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A processing system, comprising:
an on-package memory (OPM);
a memory encryption engine (MEE) circuit, the MEE circuit to:
encrypt, using a seed value, a data item to be stored in an external memory, wherein the seed value is derived from an address of the data item;
compute a first message authentication code (MAC) value of the data item;
increment a version information (VER) value associated with the data item;
store the MAC in the OPM;
store the VER value in the external memory;
store the data item in the external memory;
responsive to receiving a memory read request, retrieve the data item from the external memory;
retrieve, from the OPM, encryption metadata comprising the first MAC value associated with a data item loaded from an external memory;
retrieve, from the external memory, a VER line comprising the VER value associated with the data item;
retrieve, from the OPM, a counter value associated with the VER line;
validate the VER line by computing a second MAC value using the counter value; and
validate the data item using the first MAC value and the VER value.

2. The processing system of claim 1, wherein the MEE circuit is to encrypt the data item using an Advanced Encryption Standard (AES) counter-encryption method.

3. The processing system of claim 1, wherein validating the data item is performed using a keyed-hash message authentication code (HMAC) encryption scheme.

4. The processing system of claim 1, wherein validating the data item is performed using an XTS-AES encryption scheme.

5. The processing system of claim 1, further comprising:
a processing core; and
a memory controller operatively coupled to the processing core.

6. The processing system of claim 1, wherein the processing system is represented by a System-on-Chip (SoC).

7. A method, comprising:
encrypting, using a seed value, a data item to be stored in an external memory, wherein the seed value is derived from an address of the data item;
computing a first message authentication code (MAC) value of the data item;
incrementing a version information (VER) value associated with the data item;
storing the data item in the external memory;
storing the MAC in an on-package memory (OPM);
storing the VER value in the external memory;
responsive to receiving a memory read request, retrieving the data item from the external memory;
retrieving, from the OPM, encryption metadata comprising the first MAC value associated with the data item;
retrieving, from the external memory, a VER line comprising the VER value associated with the data item;
retrieving, from the OPM, a counter value associated with the VER line;
validating the VER line by computing a second MAC value using the counter value; and
validating the data item using the first MAC value and the VER value.

8. The method of claim 7, wherein encrypting the data item is performed using an Advanced Encryption Standard (AES) counter-encryption method.

9. The method of claim 7, wherein retrieving the data item from the external memory is performed in parallel with retrieving the encryption metadata from the on-package memory.

10. The method of claim 7, wherein encrypting the data item is performed using an XTS-AES encryption scheme.

11. The method of claim 7, wherein validating the data item is performed using a keyed-hash message authentication code (HMAC) encryption scheme.

12. The method of claim 7, wherein encrypting the data item further comprises: determining a cryptopad value by applying an Advanced Encryption Standard (AES) encryption to the seed value; and producing an encrypted data item by combining the data item with the cryptopad value.

13. The method of claim 7, wherein validating the data item comprises calculating a value of a cryptographic hash function of a combination of the data item and a secret key value.

14. The processing system of claim 1, wherein validating the data item comprises calculating a value of a cryptographic hash function of a combination of the data item and a secret key value.

15. The processing system of claim 1, wherein encrypting the data item further comprises:
   determining a cryptopad value by applying an Advanced Encryption Standard (AES) encryption to the seed value; and
   producing an encrypted data item by combining the data item with the cryptopad value.

16. A system-on-chip (SoC), comprising:
   an on-package memory (OPM);
   a processing core; and
   a memory controller, operatively coupled to the processing core, the memory controller to:
      encrypt, using a seed value, a data item to be stored in an external memory, wherein the seed value is derived from an address of the data item;
      compute a first message authentication code (MAC) value of the data item;
      increment a version information (VER) value associated with the data item;
      store the MAC in the OPM;
      store the VER value in the external memory;
      store the data item in the external memory;
      responsive to receiving a memory read request, retrieve the data item from the external memory;
      retrieve, from the OPM, encryption metadata comprising the first MAC value associated with a data item loaded from an external memory;
      retrieve, from the external memory, a VER line comprising the VER value associated with the data item;
      retrieve, from the OPM, a counter value associated with the VER line;
      validate the VER line by computing a second MAC value using the counter value; and
      validate the data item using the first MAC value and the VER value.

17. The SoC of claim 16, wherein validating the data item is performed using a keyed-hash message authentication code (HMAC) encryption scheme.

18. The SoC of claim 16, wherein validating the data item is performed using an XTS-AES encryption scheme.

19. The SoC of claim 16, wherein validating the data item comprises calculating a value of a cryptographic hash function of a combination of the data item and a secret key value.

20. The SoC of claim 16, wherein encrypting the data item further comprises:
   determining a cryptopad value by applying an Advanced Encryption Standard (AES) encryption to the seed value; and
   producing an encrypted data item by combining the data item with the cryptopad value.

* * * * *